United States Patent
Gong et al.

(10) Patent No.: US 10,215,961 B2
(45) Date of Patent: Feb. 26, 2019

(54) OPTICAL IMAGING LENS SET

(71) Applicant: Genius Electronic Optical Co., Ltd., Taichung (TW)

(72) Inventors: Jinhui Gong, Fujian (CN); Jiayuan Zhang, Fujian (CN); Huabin Liao, Fujian (CN)

(73) Assignee: Genius Electronic Optical (Xiamen) Co., Ltd., Xiamen, Fujian (CN)

( * ) Notice: Subject to any disclaimer, the term of this patent is extended or adjusted under 35 U.S.C. 154(b) by 8 days.

(21) Appl. No.: 15/441,243

(22) Filed: Feb. 24, 2017

(65) Prior Publication Data

US 2018/0188484 A1 Jul. 5, 2018

(30) Foreign Application Priority Data

Dec. 30, 2016 (CN) .......................... 2016 1 1253383

(51) Int. Cl.
| | |
|---|---|
| *G02B 3/02* | (2006.01) |
| *G02B 13/00* | (2006.01) |
| *G02B 9/64* | (2006.01) |
| *G02B 13/18* | (2006.01) |

(52) U.S. Cl.
CPC ........... *G02B 13/0045* (2013.01); *G02B 9/64* (2013.01); *G02B 13/18* (2013.01)

(58) Field of Classification Search
CPC .................................................. G02B 13/0045
USPC ............................................................ 359/708
See application file for complete search history.

(56) References Cited

U.S. PATENT DOCUMENTS

| | | | |
|---|---|---|---|
| 9,128,270 B2 | 9/2015 | Nishihata | |
| 2014/0160580 A1* | 6/2014 | Nishihata | G02B 13/0045 359/708 |
| 2015/0070783 A1* | 3/2015 | Hashimoto | G02B 13/0045 359/708 |
| 2015/0277083 A1* | 10/2015 | Chae | G02B 9/64 359/708 |

FOREIGN PATENT DOCUMENTS

| | | |
|---|---|---|
| JP | 2015-55728 | 3/2015 |
| TW | I534463 B | 5/2016 |

* cited by examiner

*Primary Examiner* — James C. Jones
(74) *Attorney, Agent, or Firm* — Winston Hsu

(57) ABSTRACT

An optical lens set includes: a first, second, third, fourth, fifth, sixth and seventh lens element, said first lens element has positive refractive power, said second lens element has positive refractive power, said third lens element has negative refractive power, said sixth lens element has an object-side surface with a concave part in a vicinity of the optical axis, and said seventh lens element has an image-side surface with a concave part in a vicinity of the optical axis. The optical lens set does not include any lens element with refractive power other than said first, second, third, fourth, fifth, sixth and seventh lens elements. In addition, υ6 is the Abbe number of the sixth lens element, and the optical lens set satisfies the relationship: υ6≥50.

19 Claims, 22 Drawing Sheets

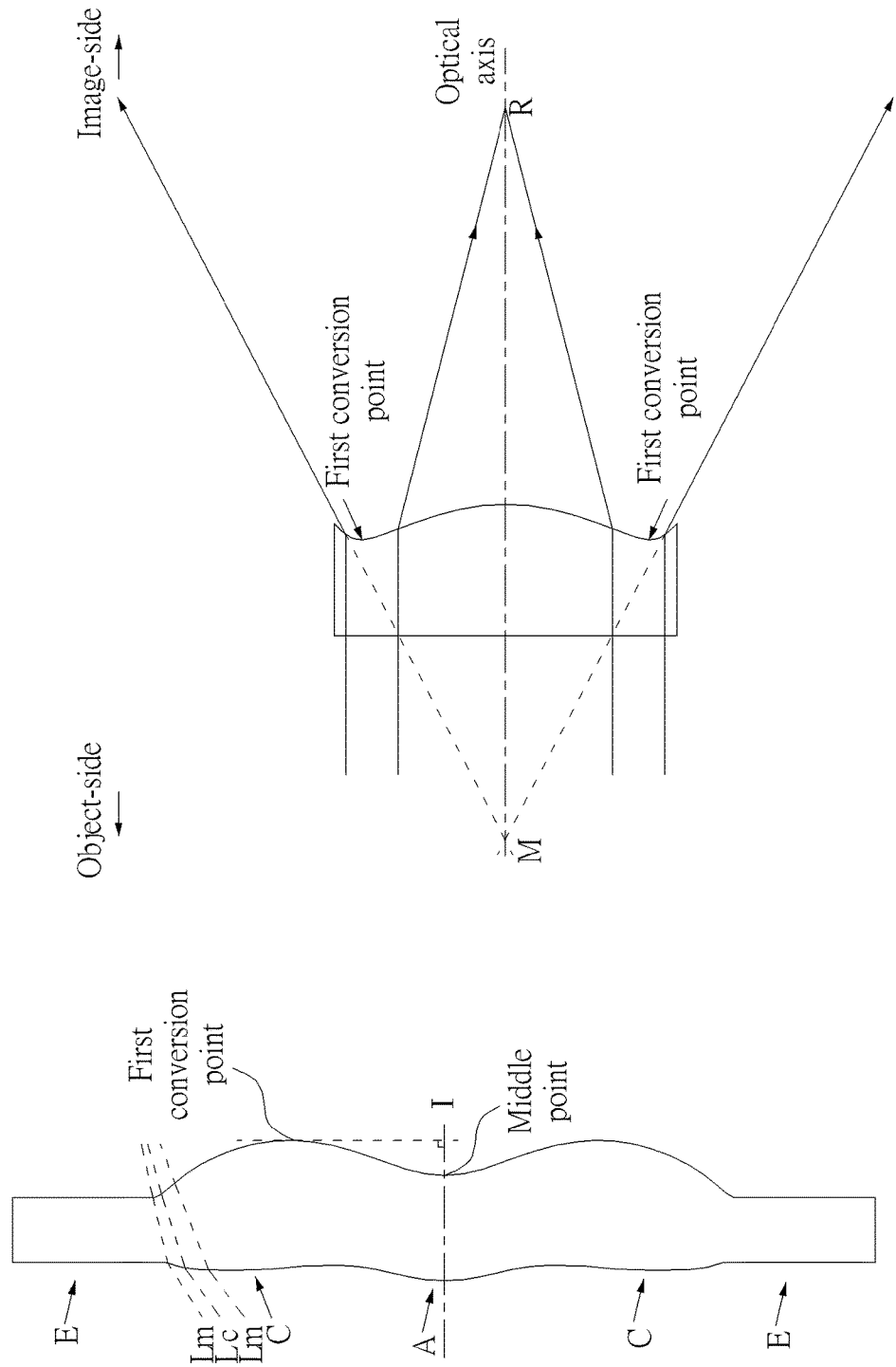

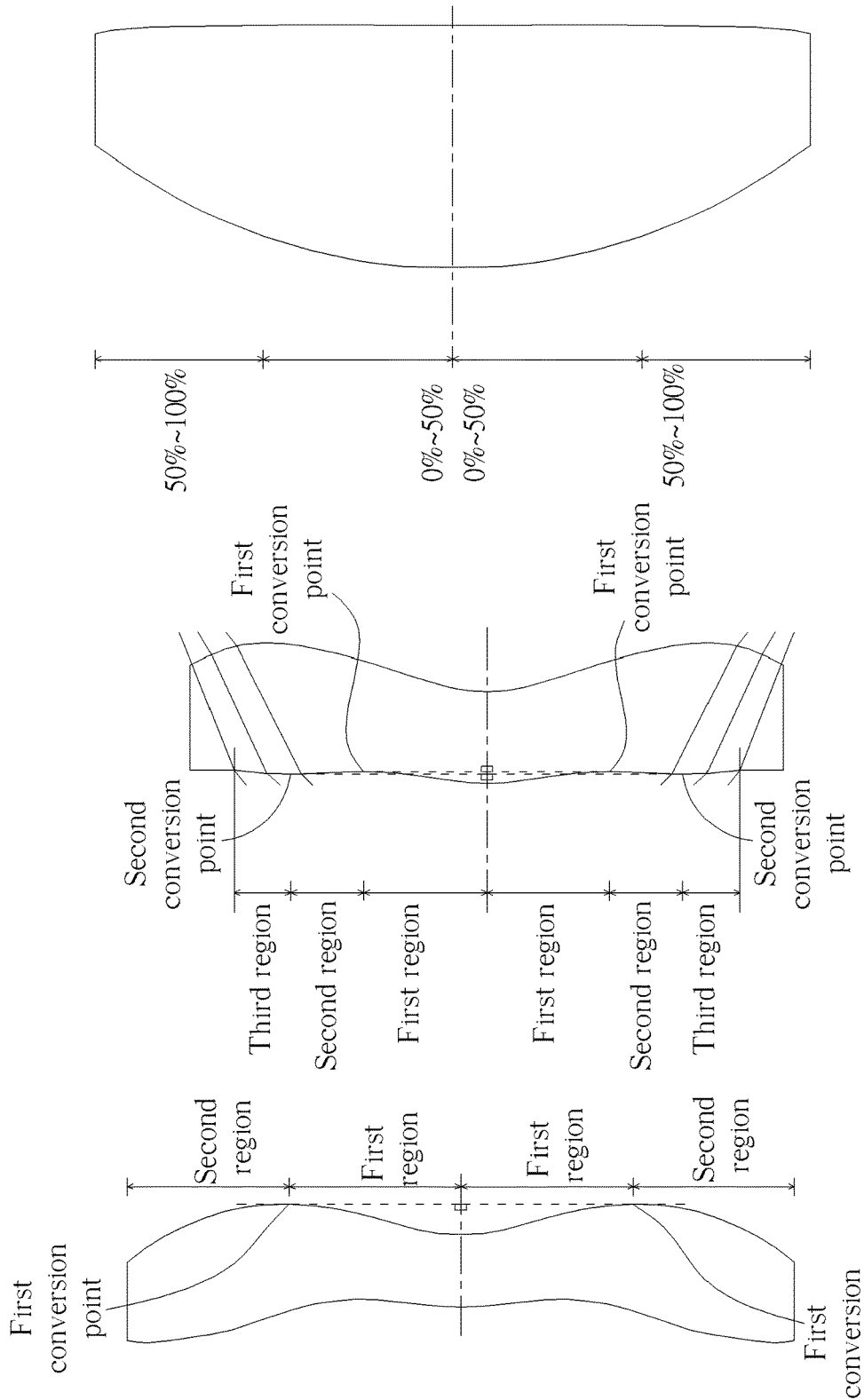

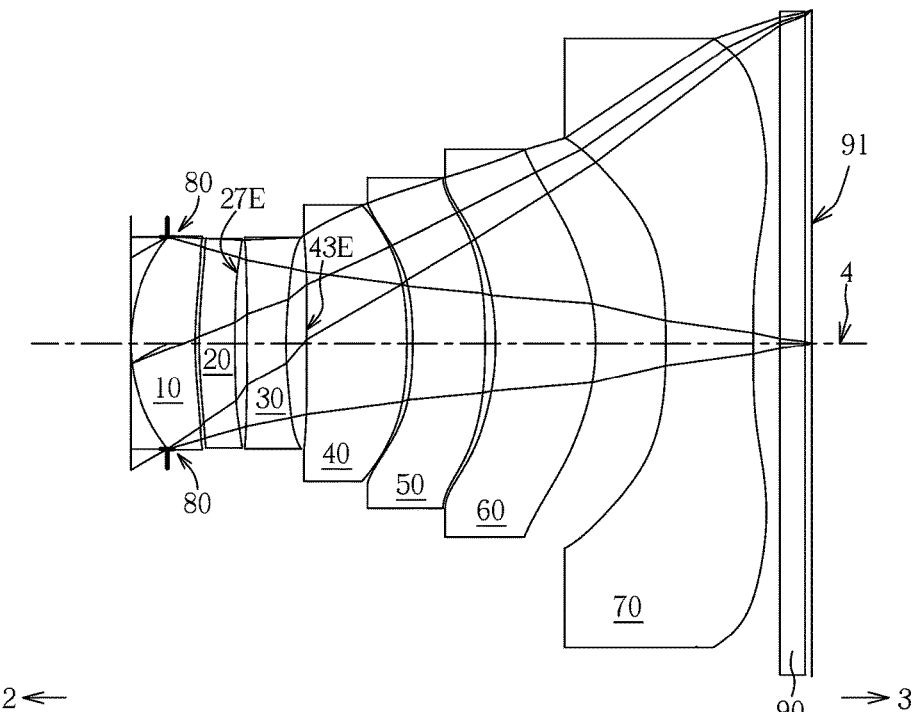
FIG. 16
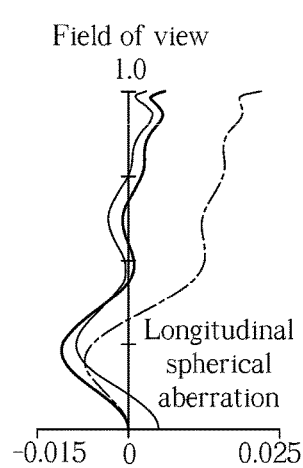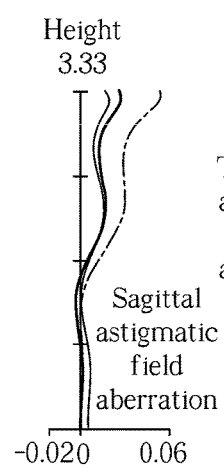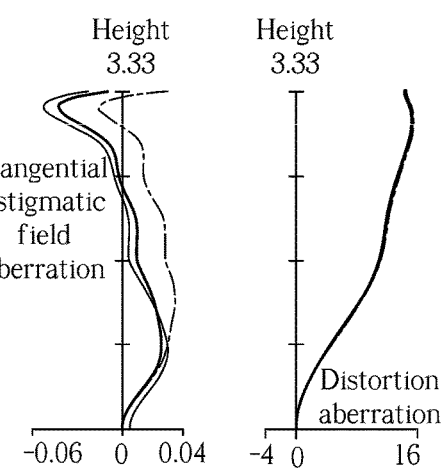
FIG. 17A   FIG. 17B   FIG. 17C   FIG. 17D

| First Example |||||||
|---|---|---|---|---|---|---|
| EFL=5.886 mm || HFOV= 28.951 deg. || TTL=6.410 mm || Fno=2.763 |
| No. | | Curvature Radius | Ape. Stop Lens Thickness Air Gap | | Refractive Index | Abbe No. | Focal Length |
| | Object | Infinity | Infinity | | | | |
| 80 | Ape. Stop | Infinity | -0.358 | | | | |
| 11 | First Lens | 1.773 | 0.801 | T1 | 1.545 | 55.987 | 5.960 |
| 12 | | 3.271 | 0.033 | G12 | | | |
| 21 | Second Lens | 3.466 | 0.381 | T2 | 1.545 | 55.987 | 7.418 |
| 22 | | 23.028 | 0.029 | G23 | | | |
| 31 | Third Lens | 7.760 | 0.270 | T3 | 1.661 | 20.368 | -6.697 |
| 32 | | 2.795 | 0.425 | G34 | | | |
| 41 | Fourth Lens | -17.582 | 0.533 | T4 | 1.535 | 55.690 | 702.600 |
| 42 | | -16.976 | 0.108 | G45 | | | |
| 51 | Fifth Lens | 17.378 | 0.270 | T5 | 1.661 | 20.368 | 20.207 |
| 52 | | -59.654 | 0.347 | G56 | | | |
| 61 | Sixth Lens | -3.203 | 0.981 | T6 | 1.545 | 55.987 | 6.821 |
| 62 | | -1.909 | 0.235 | G67 | | | |
| 71 | Seventh Lens | -9.654 | 0.688 | T7 | 1.535 | 55.690 | -3.539 |
| 72 | | 2.423 | 0.268 | G7F | | | |
| 90 | Filter | Infinity | 0.250 | | 1.517 | 64.167 | |
| | | Infinity | 0.790 | | | | |
| 91 | Image Plane | Infinity | | | | | |

FIG. 18

| No. | K | a2 | a4 | a6 | a8 |
|---|---|---|---|---|---|
| 11 | 7.411013E-02 | 0.000000E+00 | 5.073452E-04 | 1.437864E-04 | 5.258522E-03 |
| 12 | -2.969620E+01 | 0.000000E+00 | 8.005890E-03 | -4.249865E-02 | 1.188543E-01 |
| 21 | -2.780030E+01 | 0.000000E+00 | 0.000000E+00 | 0.000000E+00 | 0.000000E+00 |
| 22 | 1.779740E+02 | 0.000000E+00 | -2.366057E-01 | 8.226340E-01 | -1.686540E+00 |
| 31 | 1.957350E+00 | 0.000000E+00 | -2.852327E-01 | 7.861773E-01 | -1.574794E+00 |
| 32 | 6.701461E-01 | 0.000000E+00 | -1.029756E-01 | 1.515881E-01 | -2.234559E-01 |
| 41 | -5.449288E+02 | 0.000000E+00 | -4.772715E-02 | -4.112271E-03 | -5.587655E-02 |
| 42 | -3.295752E+02 | 0.000000E+00 | -1.095660E-01 | 1.074120E-01 | -1.993009E-01 |
| 51 | 3.536167E+01 | 0.000000E+00 | -1.642900E-01 | 1.136329E-01 | -1.106657E-01 |
| 52 | -2.094689E+04 | 0.000000E+00 | -1.266511E-01 | 3.655070E-02 | -1.356257E-02 |
| 61 | 1.336639E+00 | 0.000000E+00 | -1.629460E-02 | -6.241306E-02 | 4.570683E-02 |
| 62 | -4.610608E+00 | 0.000000E+00 | -5.056476E-03 | -1.948977E-02 | 1.842206E-02 |
| 71 | -5.841931E+01 | 0.000000E+00 | -7.575468E-02 | 2.596010E-02 | -5.968146E-04 |
| 72 | -1.320922E+01 | 0.000000E+00 | -5.468866E-02 | 2.037948E-02 | -6.091263E-03 |
| No. | a10 | a12 | a14 | a16 | |
| 11 | -8.784965E-03 | 9.114146E-03 | -4.505483E-03 | 9.479614E-04 | |
| 12 | -2.293338E-01 | 2.702915E-01 | -1.707416E-01 | 4.497264E-02 | |
| 21 | 0.000000E+00 | 0.000000E+00 | 0.000000E+00 | 0.000000E+00 | |
| 22 | 2.108637E+00 | -1.564238E+00 | 6.373290E-01 | -1.132991E-01 | |
| 31 | 1.984194E+00 | -1.487035E+00 | 6.165335E-01 | -1.146582E-01 | |
| 32 | 2.502216E-01 | -1.408277E-01 | 3.494898E-02 | 5.340644E-04 | |
| 41 | 9.072306E-02 | -1.025479E-01 | 7.003409E-02 | -1.615402E-02 | |
| 42 | 1.991329E-01 | -1.190187E-01 | 4.354056E-02 | -6.983393E-03 | |
| 51 | 6.237050E-02 | -4.888887E-03 | -6.562153E-03 | 1.538293E-03 | |
| 52 | 2.704959E-03 | 3.890369E-03 | -1.452198E-03 | 9.216448E-05 | |
| 61 | -1.786722E-02 | 2.559135E-03 | 1.312182E-03 | -3.694502E-04 | |
| 62 | -5.649752E-03 | 8.636975E-04 | -7.909387E-05 | 4.041464E-06 | |
| 71 | -1.416791E-03 | 3.685832E-04 | -4.045467E-05 | 1.703217E-06 | |
| 72 | 1.286472E-03 | -1.768787E-04 | 1.394272E-05 | -4.736306E-07 | |

FIG. 19

| Second Example |||||||
|---|---|---|---|---|---|---|
| EFL=5.045 mm || HFOV= 30.492 deg. || TTL= 6.886 mm | Fno= 2.368 ||
| No. | | Curvature Radius | Ape. Stop Lens Thickness Air Gap || Refractive Index | Abbe No. | Focal Length |
| | Object | Infinity | Infinity ||||
| 80 | Ape. Stop | Infinity | -0.267 ||||
| 11 | First Lens | 2.593 | 0.385 | T1 | 1.545 | 55.987 | 16.898 |
| 12 | | 3.418 | 0.127 | G12 |||
| 21 | Second Lens | 3.743 | 0.289 | T2 | 1.545 | 55.987 | 8.088 |
| 22 | | 23.800 | 0.039 | G23 |||
| 31 | Third Lens | 10.172 | 0.200 | T3 | 1.661 | 20.368 | -12.653 |
| 32 | | 4.576 | 0.605 | G34 |||
| 41 | Fourth Lens | 131.540 | 0.498 | T4 | 1.535 | 55.690 | 26.335 |
| 42 | | -15.811 | 0.361 | G45 |||
| 51 | Fifth Lens | 9.257 | 0.285 | T5 | 1.661 | 20.368 | -14.708 |
| 52 | | 4.704 | 0.540 | G56 |||
| 61 | Sixth Lens | -26.181 | 0.696 | T6 | 1.545 | 55.987 | 3.904 |
| 62 | | -1.991 | 1.669 | G67 |||
| 71 | Seventh Lens | -3.800 | 0.430 | T7 | 1.535 | 55.690 | -3.599 |
| 72 | | 4.084 | 0.5 | G7F |||
| 90 | Filter | Infinity | 0.250 || 1.517 | 64.167 ||
| | | Infinity | 0.01 ||||
| 91 | Image Plane | Infinity |||||

FIG. 20

| No. | K | a2 | a4 | a6 | a8 |
|---|---|---|---|---|---|
| 11 | 1.206344E+00 | 0.000000E+00 | 5.820407E-03 | 4.661111E-03 | 1.737276E-02 |
| 12 | -1.093798E+01 | 0.000000E+00 | -2.137398E-03 | 1.973547E-02 | 3.174782E-02 |
| 21 | -2.266037E+01 | 0.000000E+00 | 0.000000E+00 | 0.000000E+00 | 0.000000E+00 |
| 22 | 1.276962E+02 | 0.000000E+00 | -1.481881E-01 | 5.282862E-01 | -8.339573E-01 |
| 31 | 3.747442E+01 | 0.000000E+00 | -2.135691E-01 | 6.170291E-01 | -9.940526E-01 |
| 32 | 4.189826E-01 | 0.000000E+00 | -1.152490E-01 | 2.133368E-01 | -2.778812E-01 |
| 41 | 7.579057E+03 | 0.000000E+00 | -6.495381E-02 | 3.466340E-02 | -7.180271E-02 |
| 42 | 1.047865E+02 | 0.000000E+00 | -9.092546E-02 | 4.903033E-02 | -7.549365E-02 |
| 51 | -4.401833E+01 | 0.000000E+00 | -1.837153E-01 | 1.091411E-01 | -1.011367E-01 |
| 52 | -5.906960E+01 | 0.000000E+00 | -1.061173E-01 | 3.132240E-02 | -1.705530E-02 |
| 61 | 1.474544E+02 | 0.000000E+00 | -2.018822E-02 | 1.226755E-04 | -8.528277E-04 |
| 62 | -2.426463E+00 | 0.000000E+00 | -1.433637E-02 | 4.385494E-04 | 2.925365E-03 |
| 71 | -8.976559E+00 | 0.000000E+00 | -2.551229E-02 | 3.601530E-03 | -1.702524E-03 |
| 72 | -1.385602E+00 | 0.000000E+00 | -2.126722E-02 | -2.389051E-03 | 2.071085E-03 |
| No. | a10 | a12 | a14 | a16 | |
| 11 | -2.924631E-02 | 3.657240E-02 | -2.107874E-02 | 4.942908E-03 | |
| 12 | -7.271760E-02 | 8.794964E-02 | -3.582615E-02 | -9.170206E-04 | |
| 21 | 0.000000E+00 | 0.000000E+00 | 0.000000E+00 | 0.000000E+00 | |
| 22 | 5.715720E-01 | -5.690891E-02 | -1.080622E-01 | 3.577058E-02 | |
| 31 | 8.263350E-01 | -3.111096E-01 | 2.415629E-02 | 5.854244E-03 | |
| 32 | 2.222190E-01 | -7.151095E-02 | -7.871293E-03 | 6.183891E-03 | |
| 41 | 9.838124E-02 | -8.474874E-02 | 3.930443E-02 | -7.126804E-03 | |
| 42 | 7.339396E-02 | -4.450441E-02 | 1.506684E-02 | -2.080286E-03 | |
| 51 | 7.825717E-02 | -2.968301E-02 | 5.146487E-03 | -3.281229E-04 | |
| 52 | 1.018878E-02 | -6.933972E-04 | -7.790180E-04 | 1.351811E-04 | |
| 61 | -4.657173E-03 | 3.662255E-03 | -8.852815E-04 | 7.152122E-05 | |
| 62 | -3.174889E-03 | 9.249418E-04 | -1.784750E-05 | -1.118845E-05 | |
| 71 | 1.278099E-03 | -4.855351E-04 | 8.213270E-05 | -5.361779E-06 | |
| 72 | -4.803019E-04 | 5.530908E-05 | -3.253090E-06 | 7.720968E-08 | |

FIG. 21

| Third Example | | | | | | |
|---|---|---|---|---|---|---|
| EFL=6.659 mm | | HFOV= 27.204 deg. | | TTL= =6.664 mm | | Fno= 3.106 |
| No. | | Curvature Radius | Ape. Stop Lens Thickness Air Gap | | Refractive Index | Abbe No. | Focal Length |
| | Object | Infinity | Infinity | | | | |
| 80 | Ape. Stop | Infinity | -0.369 | | | | |
| 11 | First Lens | 1.746 | 0.518 | T1 | 1.545 | 55.987 | 8.151 |
| 12 | | 2.571 | 0.061 | G12 | | | |
| 21 | Second Lens | 2.755 | 0.331 | T2 | 1.545 | 55.987 | 6.708 |
| 22 | | 10.630 | 0.043 | G23 | | | |
| 31 | Third Lens | 9.119 | 0.180 | T3 | 1.661 | 20.368 | -7.729 |
| 32 | | 3.267 | 0.222 | G34 | | | |
| 41 | Fourth Lens | -53.714 | 1.000 | T4 | 1.535 | 55.690 | -120.783 |
| 42 | | -315.766 | 0.080 | G45 | | | |
| 51 | Fifth Lens | 494.629 | 0.285 | T5 | 1.661 | 20.368 | 33.582 |
| 52 | | -23.454 | 0.100 | G56 | | | |
| 61 | Sixth Lens | -4.122 | 0.276 | T6 | 1.545 | 55.987 | 24.169 |
| 62 | | -3.215 | 1.994 | G67 | | | |
| 71 | Seventh Lens | -2.934 | 0.444 | T7 | 1.535 | 55.690 | -5.238 |
| 72 | | 70.574 | 0.268 | G7F | | | |
| 90 | Filter | Infinity | 0.25 | | 1.517 | 64.167 | |
| | | Infinity | 0.612 | | | | |
| 91 | Image Plane | Infinity | | | | | |

FIG. 22

| No. | K | a2 | a4 | a6 | a8 |
|---|---|---|---|---|---|
| 11 | 1.032540E-01 | 0.000000E+00 | -2.325733E-03 | 5.245119E-03 | 4.763442E-03 |
| 12 | -2.667427E+01 | 0.000000E+00 | 2.330916E-02 | -9.772117E-02 | 2.288214E-01 |
| 21 | -3.030843E+01 | 0.000000E+00 | 0.000000E+00 | 0.000000E+00 | 0.000000E+00 |
| 22 | 7.541810E+01 | 0.000000E+00 | -2.485737E-01 | 9.418233E-01 | -2.015715E+00 |
| 31 | 2.658428E+01 | 0.000000E+00 | -2.962598E-01 | 9.336719E-01 | -2.119623E+00 |
| 32 | -1.878424E+00 | 0.000000E+00 | -1.326306E-01 | 2.430962E-01 | -5.339699E-01 |
| 41 | -1.000000E+01 | 0.000000E+00 | -3.321470E-02 | -2.969189E-02 | -1.664288E-03 |
| 42 | -5.000000E+00 | 0.000000E+00 | -1.127359E-01 | 1.126826E-01 | -2.354653E-01 |
| 51 | 0.000000E+00 | 0.000000E+00 | 0.000000E+00 | 0.000000E+00 | 0.000000E+00 |
| 52 | 9.999995E+00 | 0.000000E+00 | -1.564672E-01 | 1.036801E-01 | -9.575048E-02 |
| 61 | 1.410872E+00 | 0.000000E+00 | -1.242128E-02 | -5.962845E-03 | -3.301237E-02 |
| 62 | -1.745468E+01 | 0.000000E+00 | 1.775977E-03 | 4.760186E-02 | -5.855844E-02 |
| 71 | -9.907868E+00 | 0.000000E+00 | -5.363107E-02 | 1.877804E-02 | -4.700352E-03 |
| 72 | -2.612378E+08 | 0.000000E+00 | -2.126150E-02 | 2.802171E-03 | -1.621739E-05 |
| No. | a10 | a12 | a14 | a16 | |
| 11 | -1.915837E-02 | 3.129149E-02 | -2.173102E-02 | 6.129387E-03 | |
| 12 | -4.024717E-01 | 4.592227E-01 | -2.821328E-01 | 7.122103E-02 | |
| 21 | 0.000000E+00 | 0.000000E+00 | 0.000000E+00 | 0.000000E+00 | |
| 22 | 2.579478E+00 | -2.016118E+00 | 9.120028E-01 | -1.868269E-01 | |
| 31 | 3.066710E+00 | -2.710989E+00 | 1.365018E+00 | -3.028863E-01 | |
| 32 | 9.182726E-01 | -9.017379E-01 | 4.624383E-01 | -9.277933E-02 | |
| 41 | 8.171434E-03 | 2.661971E-02 | -6.277631E-02 | 3.335444E-02 | |
| 42 | 2.170703E-01 | -9.847635E-02 | 2.276328E-02 | -2.054994E-03 | |
| 51 | 0.000000E+00 | 0.000000E+00 | 0.000000E+00 | 0.000000E+00 | |
| 52 | 7.540475E-02 | -3.638159E-02 | 1.034008E-02 | -1.227542E-03 | |
| 61 | 3.721101E-02 | -1.830789E-02 | 4.917304E-03 | -5.019143E-04 | |
| 62 | 4.538650E-02 | -1.939042E-02 | 4.123187E-03 | -3.473168E-04 | |
| 71 | 1.167168E-03 | -1.995166E-04 | 1.832004E-05 | -6.922224E-07 | |
| 72 | -8.228489E-05 | 1.611708E-05 | -1.345394E-06 | 4.064890E-08 | |

FIG. 23

| Fourth Example | | | | | | |
|---|---|---|---|---|---|---|
| EFL=6.697 mm | | HFOV= 26.153 deg. | | TTL= 6.891 mm | | Fno= 3.143 |
| No. | | Curvature Radius | Ape. Stop Lens Thickness Air Gap | | Refractive Index | Abbe No. | Focal Length |
| | Object | Infinity | Infinity | | | | |
| 80 | Ape. Stop | Infinity | -0.368 | | | | |
| 11 | First Lens | 1.736 | 0.542 | T1 | 1.545 | 55.987 | 5.303 |
| 12 | | 3.856 | 0.060 | G12 | | | |
| 21 | Second Lens | 4.336 | 0.371 | T2 | 1.545 | 55.987 | 12.697 |
| 22 | | 11.214 | 0.040 | G23 | | | |
| 31 | Third Lens | 5.066 | 0.180 | T3 | 1.661 | 20.368 | -7.347 |
| 32 | | 2.455 | 0.519 | G34 | | | |
| 41 | Fourth Lens | -11.041 | 0.740 | T4 | 1.535 | 55.690 | 119.671 |
| 42 | | -9.641 | 0.049 | G45 | | | |
| 51 | Fifth Lens | -27.156 | 0.314 | T5 | 1.661 | 20.368 | 66.778 |
| 52 | | -16.948 | 0.500 | G56 | | | |
| 61 | Sixth Lens | -3.148 | 0.551 | T6 | 1.545 | 55.987 | 3.115 |
| 62 | | -1.173 | 0.172 | G67 | | | |
| 71 | Seventh Lens | -3.106 | 0.432 | T7 | 1.535 | 55.690 | -2.449 |
| 72 | | 2.389 | 0.268 | G7F | | | |
| 90 | Filter | Infinity | 0.250 | | 1.517 | 64.167 | |
| | | Infinity | 1.903 | | | | |
| 91 | Image Plane | Infinity | | | | | |

FIG. 24

| No. | K | a2 | a4 | a6 | a8 |
|---|---|---|---|---|---|
| 11 | 7.678700E-02 | 0.000000E+00 | 4.547887E-04 | 3.737298E-03 | -7.587925E-03 |
| 12 | -3.245659E+01 | 0.000000E+00 | 7.120632E-03 | -4.569966E-02 | 1.600523E-01 |
| 21 | -2.867622E+01 | 0.000000E+00 | 0.000000E+00 | 0.000000E+00 | 0.000000E+00 |
| 22 | 9.053209E+01 | 0.000000E+00 | -1.862965E-01 | 6.188484E-01 | -1.145252E+00 |
| 31 | 6.219462E+00 | 0.000000E+00 | -2.941097E-01 | 7.350080E-01 | -1.264149E+00 |
| 32 | 5.906947E-01 | 0.000000E+00 | -1.563942E-01 | 2.668847E-01 | -3.325923E-01 |
| 41 | -1.000002E+01 | 0.000000E+00 | -3.599188E-02 | -5.224176E-02 | 3.718647E-02 |
| 42 | -4.999995E+00 | 0.000000E+00 | -2.301465E-02 | -1.206638E-01 | 1.563172E-01 |
| 51 | -4.248215E+03 | 0.000000E+00 | -1.403704E-01 | 4.576955E-02 | -7.927039E-03 |
| 52 | 1.000146E+01 | 0.000000E+00 | -1.554303E-01 | 8.901868E-02 | -5.366862E-02 |
| 61 | 7.715497E-01 | 0.000000E+00 | -8.035347E-02 | 5.290335E-02 | -5.323081E-02 |
| 62 | -5.000945E+00 | 0.000000E+00 | -5.055692E-02 | 6.045978E-02 | -5.384167E-02 |
| 71 | -3.848896E+01 | 0.000000E+00 | -4.066456E-02 | -2.210646E-02 | 2.714758E-02 |
| 72 | -1.879832E+01 | 0.000000E+00 | -7.326124E-02 | 2.533177E-02 | -6.850986E-03 |
| No. | a10 | a12 | a14 | a16 | |
| 11 | 1.647904E-02 | -1.787810E-02 | 1.049430E-02 | -2.395471E-03 | |
| 12 | -3.574304E-01 | 4.316874E-01 | -2.602594E-01 | 6.356468E-02 | |
| 21 | 0.000000E+00 | 0.000000E+00 | 0.000000E+00 | 0.000000E+00 | |
| 22 | 1.279581E+00 | -9.073300E-01 | 3.981844E-01 | -8.403171E-02 | |
| 31 | 1.476036E+00 | -1.154559E+00 | 5.710922E-01 | -1.356501E-01 | |
| 32 | 3.515039E-01 | -2.606190E-01 | 1.342868E-01 | -3.196430E-02 | |
| 41 | -3.392505E-02 | 2.727099E-02 | -2.737263E-02 | 1.710132E-02 | |
| 42 | -1.774604E-01 | 1.398557E-01 | -5.943650E-02 | 1.067722E-02 | |
| 51 | -1.788438E-02 | 2.842298E-02 | -1.364773E-02 | 2.150268E-03 | |
| 52 | 3.234761E-02 | -1.608409E-02 | 5.696330E-03 | -8.545268E-04 | |
| 61 | 4.653619E-02 | -2.740994E-02 | 9.934443E-03 | -1.467626E-03 | |
| 62 | 4.102032E-02 | -1.663048E-02 | 3.346517E-03 | -2.713189E-04 | |
| 71 | -9.672505E-03 | 1.795325E-03 | -1.802569E-04 | 7.670010E-06 | |
| 72 | 1.334278E-03 | -1.732500E-04 | 1.265078E-05 | -3.774031E-07 | |

FIG. 25

| Fifth Example ||||||
|---|---|---|---|---|---|
| EFL=6.233 mm || HFOV= 28.482 deg. || TTL= 6.649 mm | Fno= 2.927 |
| No. | | Curvature Radius | Ape. Stop Lens Thickness Air Gap || Refractive Index | Abbe No. | Focal Length |
| | Object | Infinity | Infinity |||||
| 80 | Ape. Stop | Infinity | -0.370 ||||
| 11 | First Lens | 1.728 | 0.620 | T1 | 1.545 | 55.987 | 4.408 |
| 12 | | 5.337 | 0.050 | G12 | | | |
| 21 | Second Lens | 6.487 | 0.282 | T2 | 1.545 | 55.987 | 73.721 |
| 22 | | 7.614 | 0.087 | G23 | | | |
| 31 | Third Lens | 4.785 | 0.164 | T3 | 1.661 | 20.368 | -8.505 |
| 32 | | 2.560 | 0.296 | G34 | | | |
| 41 | Fourth Lens | 262.119 | 0.696 | T4 | 1.535 | 55.690 | 19.953 |
| 42 | | -11.152 | 0.767 | G45 | | | |
| 51 | Fifth Lens | -10.486 | 0.328 | T5 | 1.661 | 20.368 | 420.436 |
| 52 | | -10.234 | 0.104 | G56 | | | |
| 61 | Sixth Lens | -3.022 | 0.911 | T6 | 1.545 | 55.987 | 3.944 |
| 62 | | -1.392 | 0.183 | G67 | | | |
| 71 | Seventh Lens | -14.583 | 0.447 | T7 | 1.535 | 55.690 | -2.821 |
| 72 | | 1.707 | 0.268 | G7F | 0 | 0 | 0 |
| 90 | Filter | Infinity | 0.250 || 1.517 | 64.167 | |
| | | Infinity | 1.197 ||||
| 91 | Image Plane | Infinity |||||

FIG. 26

| No. | K | a2 | a4 | a6 | a8 |
|---|---|---|---|---|---|
| 11 | 7.834278E-02 | 0.000000E+00 | -1.117734E-03 | 4.944606E-03 | 1.005122E-02 |
| 12 | -4.259297E+01 | 0.000000E+00 | -9.637297E-02 | 4.973372E-01 | -1.320366E+00 |
| 21 | -1.681069E+01 | 0.000000E+00 | 0.000000E+00 | 0.000000E+00 | 0.000000E+00 |
| 22 | 2.542700E+01 | 0.000000E+00 | -1.228158E-01 | 5.245220E-01 | -1.960528E+00 |
| 31 | 9.161323E-01 | 0.000000E+00 | -2.251170E-01 | 4.768765E-01 | -1.423657E+00 |
| 32 | 9.012004E-01 | 0.000000E+00 | -1.651426E-01 | 2.816660E-01 | -5.340164E-01 |
| 41 | -1.000000E+01 | 0.000000E+00 | -6.316075E-02 | -2.239812E-02 | 1.364384E-01 |
| 42 | -5.000257E+00 | 0.000000E+00 | -6.074359E-02 | 3.015251E-03 | -1.078237E-03 |
| 51 | 3.056802E+01 | 0.000000E+00 | -1.341744E-01 | 8.002668E-03 | -5.399446E-02 |
| 52 | 1.221166E+01 | 0.000000E+00 | -1.210002E-01 | -3.400366E-04 | -9.253436E-03 |
| 61 | -5.910424E-01 | 0.000000E+00 | -9.516023E-03 | -2.526167E-03 | -7.260428E-03 |
| 62 | -4.908955E+00 | 0.000000E+00 | -2.279568E-02 | -4.738459E-03 | 3.065475E-02 |
| 71 | -1.709328E+01 | 0.000000E+00 | -7.830736E-02 | 1.076771E-02 | 1.415771E-02 |
| 72 | -1.020447E+01 | 0.000000E+00 | -7.427060E-02 | 2.942601E-02 | -8.759660E-03 |
| No. | a10 | a12 | a14 | a16 | |
| 11 | -3.552559E-02 | 4.697286E-02 | -2.796662E-02 | 5.929880E-03 | |
| 12 | 2.011230E+00 | -1.751202E+00 | 8.003849E-01 | -1.491326E-01 | |
| 21 | 0.000000E+00 | 0.000000E+00 | 0.000000E+00 | 0.000000E+00 | |
| 22 | 4.228728E+00 | -4.940547E+00 | 2.930735E+00 | -6.910734E-01 | |
| 31 | 3.578565E+00 | -5.055252E+00 | 3.548532E+00 | -9.709058E-01 | |
| 32 | 1.521083E+00 | -2.558430E+00 | 2.006099E+00 | -5.801955E-01 | |
| 41 | -3.256699E-01 | 4.778581E-01 | -4.407317E-01 | 1.639200E-01 | |
| 42 | 1.358137E-02 | -1.992834E-02 | 1.006264E-02 | -1.592800E-03 | |
| 51 | 7.706332E-02 | -2.446578E-02 | -2.774143E-04 | 7.433431E-03 | |
| 52 | 1.052000E-02 | 4.266526E-03 | -2.730119E-03 | 2.694840E-04 | |
| 61 | 5.272375E-03 | -3.090433E-03 | 1.270191E-03 | -1.754195E-04 | |
| 62 | -2.246269E-02 | 7.824981E-03 | -1.358036E-03 | 9.342935E-05 | |
| 71 | -7.000051E-03 | 1.445791E-03 | -1.461973E-04 | 5.883587E-06 | |
| 72 | 1.925107E-03 | -2.911999E-04 | 2.601328E-05 | -1.011081E-06 | |

FIG. 27

| Sixth Example | | | | | | |
|---|---|---|---|---|---|---|
| EFL=5.120 mm | | HFOV= 29.610 deg. | | TTL= 6.816 mm | | Fno= 2.404 |
| No. | | Curvature Radius | Ape. Stop Lens Thickness Air Gap | | Refractive Index | Abbe No. | Focal Length |
| | Object | Infinity | Infinity | | | | |
| 80 | Ape. Stop | Infinity | -0.367 | | | | |
| 11 | First Lens | 1.761 | 0.646 | T1 | 1.545 | 55.987 | 5.373 |
| 12 | | 3.833 | 0.040 | G12 | | | |
| 21 | Second Lens | 4.311 | 0.356 | T2 | 1.545 | 55.987 | 13.876 |
| 22 | | 9.705 | 0.120 | G23 | | | |
| 31 | Third Lens | 12.241 | 0.391 | T3 | 1.661 | 20.368 | -7.752 |
| 32 | | 3.588 | 0.205 | G34 | | | |
| 41 | Fourth Lens | 29.838 | 1.000 | T4 | 1.535 | 55.690 | 9.410 |
| 42 | | -6.007 | 0.059 | G45 | | | |
| 51 | Fifth Lens | -6.455 | 0.729 | T5 | 1.661 | 20.368 | -33.487 |
| 52 | | -9.490 | 0.104 | G56 | | | |
| 61 | Sixth Lens | -3.397 | 1.000 | T6 | 1.545 | 55.987 | 11.605 |
| 62 | | -2.442 | 0.702 | G67 | | | |
| 71 | Seventh Lens | -7.642 | 0.878 | T7 | 1.535 | 55.690 | -14.226 |
| 72 | | 6817.559 | 0.268 | G7F | | | |
| 90 | Filter | Infinity | 0.250 | | 1.517 | 64.167 | |
| | | Infinity | 0.068 | | | | |
| 91 | Image Plane | Infinity | | | | | |

FIG. 28

| No. | K | a2 | a4 | a6 | a8 |
|---|---|---|---|---|---|
| 11 | 1.028543E-01 | 0.000000E+00 | 2.797442E-03 | -1.144469E-02 | 5.762238E-02 |
| 12 | -6.648426E+01 | 0.000000E+00 | -5.702264E-02 | 2.425846E-01 | -4.987614E-01 |
| 21 | -5.880380E+01 | 0.000000E+00 | 0.000000E+00 | 0.000000E+00 | 0.000000E+00 |
| 22 | 7.400527E+01 | 0.000000E+00 | -2.012413E-01 | 9.061274E-01 | -2.263984E+00 |
| 31 | 3.768560E+01 | 0.000000E+00 | -2.905916E-01 | 8.008509E-01 | -1.706271E+00 |
| 32 | 2.950101E-01 | 0.000000E+00 | -2.039655E-01 | 4.435063E-01 | -8.230218E-01 |
| 41 | -1.000000E+01 | 0.000000E+00 | -6.758588E-02 | 9.762275E-02 | -1.540013E-01 |
| 42 | -5.002464E+00 | 0.000000E+00 | -2.050438E-01 | 2.606418E-01 | -2.734301E-01 |
| 51 | -2.223150E+01 | 0.000000E+00 | -2.748983E-01 | 2.689956E-01 | -2.764077E-01 |
| 52 | 1.021302E+01 | 0.000000E+00 | -1.972683E-01 | 2.965348E-01 | -3.192314E-01 |
| 61 | -6.194834E-01 | 0.000000E+00 | -1.803460E-01 | 3.936193E-01 | -4.405738E-01 |
| 62 | -1.612107E+00 | 0.000000E+00 | -5.109062E-02 | 7.205767E-02 | -5.470295E-02 |
| 71 | 5.665667E+00 | 0.000000E+00 | -7.442952E-02 | 5.043243E-02 | -5.906371E-02 |
| 72 | -9.138035E+22 | 0.000000E+00 | 1.069215E-01 | -6.646037E-02 | 1.889076E-02 |
| No. | a10 | a12 | a14 | a16 | |
| 11 | -1.179223E-01 | 1.292748E-01 | -7.196865E-02 | 1.704036E-02 | |
| 12 | 3.200993E-01 | 2.132842E-01 | -3.836519E-01 | 1.470138E-01 | |
| 21 | 0.000000E+00 | 0.000000E+00 | 0.000000E+00 | 0.000000E+00 | |
| 22 | 3.954362E+00 | -4.299210E+00 | 2.475818E+00 | -5.769074E-01 | |
| 31 | 2.738538E+00 | -2.770909E+00 | 1.493919E+00 | -3.264126E-01 | |
| 32 | 1.246553E+00 | -1.165815E+00 | 6.063654E-01 | -1.298493E-01 | |
| 41 | 1.063064E-01 | 3.353657E-02 | -8.290156E-02 | 3.037553E-02 | |
| 42 | 1.353210E-01 | -8.844282E-03 | -1.466989E-02 | 3.544262E-03 | |
| 51 | 1.764649E-01 | -4.785107E-02 | 1.550509E-03 | 1.024356E-03 | |
| 52 | 1.979282E-01 | -7.152242E-02 | 1.465084E-02 | -1.314450E-03 | |
| 61 | 2.644158E-01 | -9.154730E-02 | 1.798713E-02 | -1.559144E-03 | |
| 62 | 2.253548E-02 | -5.029280E-03 | 5.908073E-04 | -2.955101E-05 | |
| 71 | 3.473413E-02 | -1.033876E-02 | 1.562692E-03 | -9.700417E-05 | |
| 72 | -3.106729E-03 | 3.053650E-04 | -1.676269E-05 | 3.917643E-07 | |

FIG. 29

| Example | Example 1 | Example 2 | Example 3 | Example 4 | Example 5 | Example 6 |
|---|---|---|---|---|---|---|
| T1 | 0.801 | 0.385 | 0.518 | 0.542 | 0.620 | 0.646 |
| G12 | 0.033 | 0.127 | 0.061 | 0.060 | 0.050 | 0.040 |
| T2 | 0.381 | 0.289 | 0.331 | 0.371 | 0.282 | 0.356 |
| G23 | 0.029 | 0.039 | 0.043 | 0.040 | 0.087 | 0.120 |
| T3 | 0.270 | 0.200 | 0.180 | 0.180 | 0.164 | 0.391 |
| G34 | 0.425 | 0.605 | 0.222 | 0.519 | 0.296 | 0.205 |
| T4 | 0.533 | 0.498 | 1.000 | 0.740 | 0.696 | 1.000 |
| G45 | 0.108 | 0.361 | 0.080 | 0.049 | 0.767 | 0.059 |
| T5 | 0.270 | 0.285 | 0.285 | 0.314 | 0.328 | 0.729 |
| G56 | 0.347 | 0.540 | 0.100 | 0.500 | 0.104 | 0.104 |
| T6 | 0.981 | 0.696 | 0.276 | 0.551 | 0.911 | 1.000 |
| G67 | 0.235 | 1.669 | 1.994 | 0.172 | 0.183 | 0.702 |
| T7 | 0.688 | 0.430 | 0.444 | 0.432 | 0.447 | 0.878 |
| G7F | 0.268 | 0.500 | 0.268 | 0.268 | 0.268 | 0.268 |
| TF | 0.250 | 0.250 | 0.250 | 0.250 | 0.250 | 0.250 |
| GFP | 0.790 | 0.010 | 0.612 | 1.903 | 1.197 | 0.068 |
| AAG | 1.177 | 3.342 | 2.500 | 1.339 | 1.486 | 1.230 |
| ALT | 3.924 | 2.785 | 3.034 | 3.130 | 3.448 | 5.000 |
| BFL | 1.308 | 0.760 | 1.130 | 2.421 | 1.715 | 0.586 |
| TTL | 6.410 | 6.886 | 6.664 | 6.891 | 6.650 | 6.817 |
| TL | 5.102 | 6.126 | 5.534 | 4.470 | 4.934 | 6.231 |
| EFL | 5.887 | 5.045 | 6.660 | 6.697 | 6.234 | 5.121 |

FIG. 30

| Example | Example 1 | Example 2 | Example 3 | Example 4 | Example 5 | Example 6 |
|---|---|---|---|---|---|---|
| TTL/BFL | 4.900 | 9.061 | 5.896 | 2.846 | 3.876 | 11.627 |
| TL/ALT | 1.300 | 2.200 | 1.824 | 1.428 | 1.431 | 1.246 |
| EFL/AAG | 5.000 | 1.510 | 2.664 | 5.000 | 4.195 | 4.162 |
| TTL/T1 | 8.000 | 17.885 | 12.854 | 12.708 | 10.720 | 10.553 |
| AAG/BFL | 0.900 | 4.397 | 2.212 | 0.553 | 0.866 | 2.099 |
| TL/(G12+G23+G45) | 30.000 | 11.617 | 30.000 | 30.000 | 5.461 | 28.410 |
| T5/T3 | 1.000 | 1.427 | 1.583 | 1.747 | 2.000 | 1.864 |
| ALT/T6 | 4.000 | 4.000 | 11.000 | 5.684 | 3.785 | 5.000 |
| EFL/(G12+G23+G45) | 34.615 | 9.568 | 36.101 | 44.947 | 6.900 | 23.349 |
| EFL/ALT | 1.500 | 1.812 | 2.195 | 2.139 | 1.808 | 1.024 |
| TTL/T7 | 9.322 | 16.000 | 15.000 | 15.961 | 14.889 | 7.763 |
| AAG/G56 | 3.394 | 6.194 | 25.000 | 2.677 | 14.315 | 11.815 |
| T2/(G12+G23+G45) | 2.243 | 0.549 | 1.792 | 2.490 | 0.312 | 1.624 |
| G34/T5 | 1.574 | 2.120 | 0.778 | 1.649 | 0.902 | 0.281 |
| T6/G67 | 4.170 | 0.417 | 0.138 | 3.210 | 4.983 | 1.425 |
| T4/G56 | 1.536 | 0.923 | 10.000 | 1.480 | 6.705 | 9.603 |

FIG. 31

OPTICAL IMAGING LENS SET

BACKGROUND OF THE INVENTION

1. Field of the Invention

The present invention generally relates to an optical imaging lens set. Specifically speaking, the present invention is directed to an optical imaging lens set for use in portable electronic devices such as mobile phones, cameras, tablet personal computers, or personal digital assistants (PDA) for taking pictures and for recording videos.

2. Description of the Prior Art

The specifications of portable electronic devices change all the time and the key element—an optical imaging lens set—develops concurrently so a good imaging quality is needed as well as a smaller size. As far as the imaging quality is concerned, the demands for better imaging quality are getting higher and higher with the development of optical technology. In addition to the thinner lens sizes, the imaging quality and performance are critical as well in the optical lens design field, the spherical aberration and the aberration of the conventional optical imaging lens set are too large to satisfy the demands of the user.

To take an optical imaging lens set of seven lens elements for example, there is a longer distance from the object-side surface of the first lens element to an image plane in the conventional design and it is adverse to the thinner design of the cell phones and digital cameras. The designing of the optical lens is not just scaling down the optical lens which has good optical performance, but also needs to consider the material characteristics and satisfy some practical requirements like assembly yield.

Accordingly, it is more difficult to diminish a mini-lens than to diminish a conventional one. Therefore, how to reduce the total length of a photographic device, but still maintain good optical performance under dim light background, is an important objective to research.

SUMMARY OF THE INVENTION

In light of the above, the present invention proposes an optical imaging lens set of seven lens elements which is shorter in total length, technically possible, has ensured imaging quality and has enhanced image definition. The optical imaging lens set of seven lens elements of the present invention from an object side toward an image side in order along an optical axis has a first lens element, a second lens element, a third lens element, a fourth lens element, a fifth lens element, a sixth lens element and a seventh lens element. Each first lens element, second lens element, third lens element, fourth lens element, fifth lens element, sixth lens element and seventh lens element respectively has an object-side surface which faces toward an object side as well as an image-side surface which faces toward an image side.

The first lens element has positive refractive power, the second lens element has positive refractive power, the third lens element has negative refractive power, the sixth lens element has an object-side surface with a concave part in a vicinity of the optical axis, and the seventh lens element has an image-side surface with a concave part in a vicinity of the optical axis. The optical lens set does not include any lens element with refractive power other than said first, second, third, fourth, fifth, sixth and seventh lens elements. In addition, $\upsilon 6$ is the Abbe number of the sixth lens element, and the optical lens set satisfies the relationship: $\upsilon 6 \geq 50$.

In another embodiment of the present invention, the present invention further proposes an optical imaging lens set of seven lens elements which is shorter in total length, technically possible, has ensured imaging quality and has enhanced image definition. The optical imaging lens set of seven lens elements of the present invention from an object side toward an image side in order along an optical axis has a first lens element, a second lens element, a third lens element, a fourth lens element, a fifth lens element, a sixth lens element and a seventh lens element. Each first lens element, second lens element, third lens element, fourth lens element, fifth lens element, sixth lens element and seventh lens element respectively has an object-side surface which faces toward an object side as well as an image-side surface which faces toward an image side.

In this embodiment of the present invention, the first lens element has positive refractive power, the second lens element has positive refractive power, the third lens element has negative refractive power, the sixth lens element has positive refractive power, and said sixth lens element has an image-side surface with a convex part in a vicinity of the optical axis, and the seventh lens element has an image-side surface with a concave part in a vicinity of the optical axis, and a convex part in a vicinity of its periphery. In addition, the optical imaging lens set exclusively has seven lens elements with refractive power.

In the optical imaging lens set of seven lens elements of the present invention, TTL is a distance from said object-side surface of said first lens element to an image plane, BFL is a distance between said image-side surface of said seventh lens element and an image plane along said optical axis, and the optical lens set satisfies the relationship: $TTL/BFL \leq 15$.

In the optical imaging lens set of seven lens elements of the present invention, TL is a distance between said object-side surface of said first lens element and said image-side surface of said seventh lens element along said optical axis, ALT is a total thickness of all seven lens elements, and the optical lens set satisfies the relationship: $TL/ALT \leq 2.2$.

In the optical imaging lens set of seven lens elements of the present invention, EFL is an effective focal length of the optical imaging lens set, AAG is a sum of all six air gaps between each lens elements from said first lens element to said seventh lens element along said optical axis, and the optical lens set satisfies the relationship: $EFL/AAG \leq 5$.

In the optical imaging lens set of seven lens elements of the present invention, TTL is a distance from said object-side surface of said first lens element to an image plane, T1 is a thickness of said first lens element along said optical axis, and the optical lens set satisfies the relationship: $TTL/T1 \leq 18$.

In the optical imaging lens set of seven lens elements of the present invention, AAG is a sum of all six air gaps between each lens elements from said first lens element to said seventh lens element along said optical axis, BFL is a distance between said image-side surface of said seventh lens element and an image plane along said optical axis, and the optical lens set satisfies the relationship: $AAG/BFL \leq 6$.

In the optical imaging lens set of seven lens elements of the present invention, TL is a distance between said object-side surface of said first lens element and said image-side surface of said seventh lens element along said optical axis, G12 is an air gap between said first lens element and said second lens element along said optical axis, G23 is an air gap between said second lens element and said third lens element along said optical axis, G45 is an air gap between said fourth lens element and said fifth lens element along said optical axis, and the optical lens set satisfies the relationship: TL/(G12+G23+G45)≤30.

In the optical imaging lens set of seven lens elements of the present invention, T3 is a thickness of said third lens element along said optical axis, T5 is a thickness of said fifth lens element along said optical axis, and the optical lens set satisfies the relationship: T5/T3≤2.

In the optical imaging lens set of seven lens elements of the present invention, ALT is a total thickness of all seven lens elements, T6 is a thickness of said sixth lens element along said optical axis, and the optical lens set satisfies the relationship: ALT/T6≤11.

In the optical imaging lens set of seven lens elements of the present invention, EFL is an effective focal length of the optical imaging lens set, G12 is an air gap between said first lens element and said second lens element along said optical axis, G23 is an air gap between said second lens element and said third lens element along said optical axis, G45 is an air gap between said fourth lens element and said fifth lens element along said optical axis, and the optical lens set satisfies the relationship: EFL/(G12+G23+G45)≤45.

In the optical imaging lens set of seven lens elements of the present invention, EFL is an effective focal length of the optical imaging lens set, ALT is a total thickness of all seven lens elements, and the optical lens set satisfies the relationship: EFL/ALT≤2.2.

In the optical imaging lens set of seven lens elements of the present invention, TTL is a distance from said object-side surface of said first lens element to an image plane, T7 is a thickness of said seventh lens element along said optical axis, and the optical lens set satisfies the relationship: TTL/T7≤16.

In the optical imaging lens set of seven lens elements of the present invention, AAG is a sum of all six air gaps between each lens elements from said first lens element to said seventh lens element along said optical axis, G56 is an air gap between said fifth lens element and said sixth lens element along said optical axis, and the optical lens set satisfies the relationship: AAG/G56≤25.

In the optical imaging lens set of seven lens elements of the present invention, T2 is a thickness of said second lens element along said optical axis, G12 is an air gap between said first lens element and said second lens element along said optical axis, G23 is an air gap between said second lens element and said third lens element along said optical axis, G45 is an air gap between said fourth lens element and said fifth lens element along said optical axis, and the optical lens set satisfies the relationship: T2/(G12+G23+G45)≤2.5.

In the optical imaging lens set of seven lens elements of the present invention, G34 is an air gap between said third lens element and said fourth lens element along said optical axis, T5 is a thickness of said fifth lens element along said optical axis, and the optical lens set satisfies the relationship: G34/T5≤2.5.

In the optical imaging lens set of seven lens elements of the present invention, G67 is an air gap between said sixth lens element and said seventh lens element along said optical axis, T6 is a thickness of said sixth lens element along said optical axis, and the optical lens set satisfies the relationship: T6/G67≤5.

In the optical imaging lens set of seven lens elements of the present invention, G56 is an air gap between said fifth lens element and said sixth lens element along said optical axis, T4 is a thickness of said fourth lens element along said optical axis, and the optical lens set satisfies the relationship: T4/G56≤10.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 1-5 illustrate the methods for determining the surface shapes and for determining one region is a region in a vicinity of the optical axis or the region in a vicinity of its periphery of one lens element.

FIG. 16 illustrates a sixth example of the optical imaging lens set of seven lens elements of the present invention.

FIG. 17A illustrates the longitudinal spherical aberration of the sixth example.

FIG. 17B illustrates the astigmatic aberration on the sagittal direction of the sixth example.

FIG. 17C illustrates the astigmatic aberration on the tangential direction of the sixth example.

FIG. 17D illustrates the distortion aberration of the sixth example.

FIG. 18 shows the optical data of the first example of the optical imaging lens set.

FIG. 19 shows the aspheric surface data of the first example.

FIG. 20 shows the optical data of the second example of the optical imaging lens set.

FIG. 21 shows the aspheric surface data of the second example.

FIG. 22 shows the optical data of the third example of the optical imaging lens set.

FIG. 23 shows the aspheric surface data of the third example.

FIG. 24 shows the optical data of the fourth example of the optical imaging lens set.

FIG. 25 shows the aspheric surface data of the fourth example.

FIG. 26 shows the optical data of the fifth example of the optical imaging lens set.

FIG. 27 shows the aspheric surface data of the fifth example.

FIG. 28 shows the optical data of the sixth example of the optical imaging lens set.

FIG. 29 shows the aspheric surface data of the sixth example.

FIG. 30 shows some important ratios in the examples.

FIG. 31 shows some important ratios in the examples.

DETAILED DESCRIPTION

Figure 6:
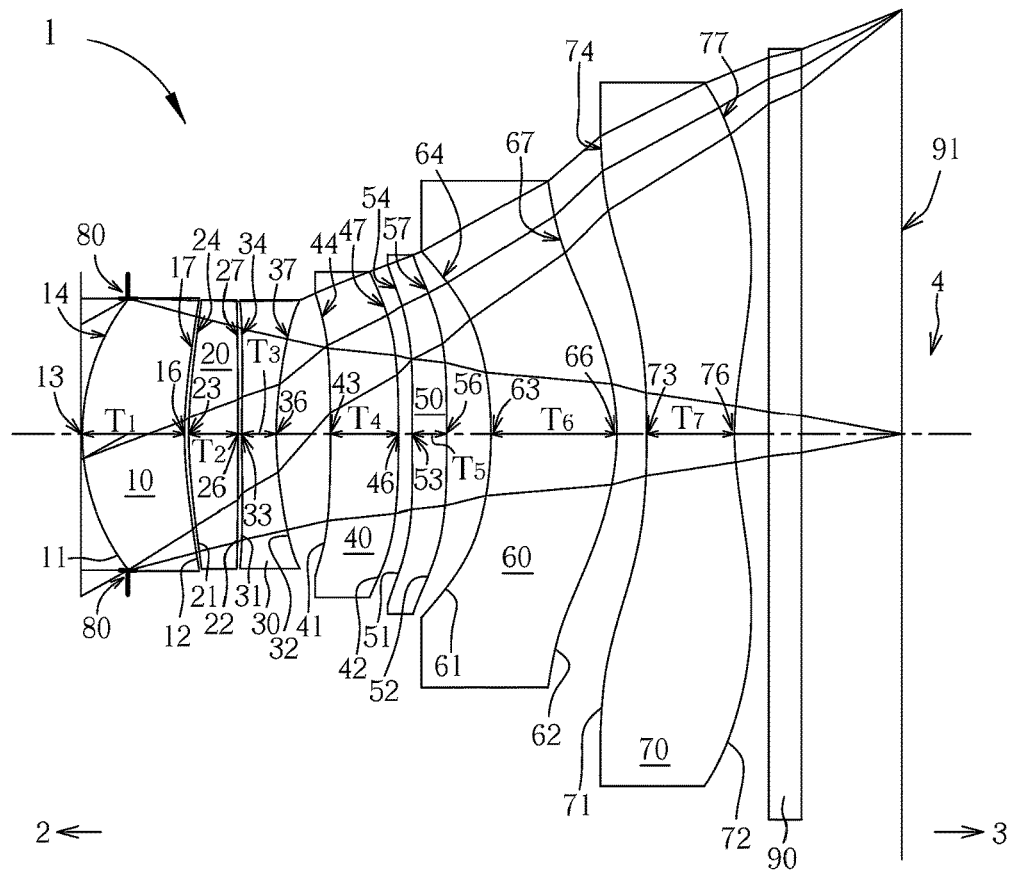
FIG. 6 illustrates a first example of the optical imaging lens set of the present invention.

Before the detailed description of the present invention, the first thing to be noticed is that in the present invention, similar (not necessarily identical) elements are labeled as the same numeral references. In the present specification, the description "a lens element having positive refracting power (or negative refracting power)" means that the paraxial refracting power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

1. FIG. 1 is a radial cross-sectional view of a lens element. Before determining boundaries of those aforesaid portions, two referential points should be defined first, middle point and conversion point. The middle point of a surface of a lens element is a point of intersection of that surface and the optical axis. The conversion point is a point on a surface of a lens element, where the tangent line of that point is perpendicular to the optical axis. Additionally, if multiple conversion points appear on one single surface, then these conversion points are sequentially named along the radial direction of the surface with numbers starting from the first conversion point. For instance, the first conversion point (closest one to the optical axis), the second conversion point, and the $N^{th}$ conversion point (farthest one to the optical axis within the scope of the clear aperture of the surface). The portion of a surface of the lens element between the middle point and the first conversion point is defined as the portion in a vicinity of the optical axis. The portion located radially outside of the $N^{th}$ conversion point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the conversion point(s). In addition, the radius of the clear aperture (or a so-called effective radius) of a surface is defined as the radial distance from the optical axis I to a point of intersection of the marginal ray Lm and the surface of the lens element.

2. Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the middle point and the first conversion point has a convex shape, the portion located radially outside of the first conversion point has a concave shape, and the first conversion point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none conversion point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of the effective radius (radius of the clear aperture) of the surface.

Referring to the first example depicted in FIG. 3, only one conversion point, namely a first conversion point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element being positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first conversion point and a second conversion point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second conversion point (portion II).

Referring to a third example depicted in FIG. 5, no conversion point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

As shown in FIG. 6, the optical imaging lens set 1 of seven lens elements of the present invention, sequentially located from an object side 2 (where an object is located) to an image side 3 along an optical axis 4, has an aperture stop (ape. stop) 80, a first lens element 10, a second lens element 20, a third lens element 30, a fourth lens element 40, a fifth lens element 50, a sixth lens element 60, a seventh lens element 70, a filter 90 and an image plane 91. Generally speaking, the first lens element 10, the second lens element 20, the third lens element 30, the fourth lens element 40, the fifth lens element 50, the sixth lens element 60 and the seventh lens element 70 may be made of a transparent plastic material but the present invention is not limited to this, and each has an appropriate refractive power. There are exclusively seven lens elements, which means the first lens element 10, the second lens element 20, the third lens element 30, the fourth lens element 40, the fifth lens element 50, the sixth lens element 60 and the seventh lens element 70, with refractive power in the optical imaging lens set 1 of the present invention. The optical axis 4 is the optical axis of the entire optical imaging lens set 1, and the optical axis of each of the lens elements coincides with the optical axis of the optical imaging lens set 1.

Furthermore, the optical imaging lens set 1 includes an aperture stop (ape. stop) 80 disposed in an appropriate position. In FIG. 6, the aperture stop 80 is disposed between the first lens element 10 and object side 2. When light emitted or reflected by an object (not shown) which is located at the object side 2 enters the optical imaging lens set 1 of the present invention, it forms a clear and sharp image on the image plane 91 at the image side 3 after passing through the aperture stop 80, the first lens element 10, the second lens element 20, the third lens element 30, the fourth lens element 40, the fifth lens element 50, the sixth lens element 60, the seventh lens element 70 and the filter 90. In one embodiment of the present invention, the optional filter 90 may be a filter of various suitable functions, for example, the filter 90 may be an infrared cut filter (IR cut filter), placed between the image-side surface 72 of the seventh lens element 70 and the image plane 91.

Each lens element in the optical imaging lens set 1 of the present invention has an object-side surface facing toward the object side 2 as well as an image-side surface facing toward the image side 3. For example, the first lens element 10 has an object-side surface 11 and an image-side surface 12; the second lens element 20 has an object-side surface 21 and an image-side surface 22; the third lens element 30 has an object-side surface 31 and an image-side surface 32; the fourth lens element 40 has an object-side surface 41 and an image-side surface 42; the fifth lens element 50 has an object-side surface 51 and an image-side surface 52; the sixth lens element 60 has an object-side surface 61 and an image-side surface 62; and the seventh lens element 70 has an object-side surface 71 and an image-side surface 72. In addition, each object-side surface and image-side surface in the optical imaging lens set 1 of the present invention has a part (or portion) in a vicinity of its periphery (periphery part) away from the optical axis 4 as well as a part in a vicinity of the optical axis (optical axis part) close to the optical axis 4.

Each lens element in the optical imaging lens set 1 of the present invention further has a central thickness T on the optical axis 4. For example, the first lens element 10 has a first lens element thickness T1, the second lens element 20 has a second lens element thickness T2, the third lens element 30 has a third lens element thickness T3, the fourth lens element 40 has a fourth lens element thickness T4, the fifth lens element 50 has a fifth lens element thickness T5, the sixth lens element 60 has a sixth lens element thickness T6, the seventh lens element 70 has a seventh lens element thickness T7. Therefore, the total thickness of all the lens elements in the optical imaging lens set 1 along the optical axis 4 is ALT=T1+T2+T3+T4+T5+T6+T7.

In addition, between two adjacent lens elements in the optical imaging lens set 1 of the present invention there may be an air gap along the optical axis 4. For example, there is an air gap G12 disposed between the first lens element 10 and the second lens element 20, an air gap G23 disposed between the second lens element 20 and the third lens element 30, an air gap G34 disposed between the third lens element 30 and the fourth lens element 40, an air gap G45 disposed between the fourth lens element 40 and the fifth lens element 50, an air gap G56 disposed between the fifth lens element 50 and the sixth lens element 60 as well as an air gap G67 disposed between the sixth lens element 60 and the seventh lens element 70. Therefore, the sum of total four air gaps between adjacent lens elements from the first lens element 10 to the sixth lens element 60 along the optical axis 4 is AAG=G12+G23+G34+G45+G56+G67.

In addition, the distance between the object-side surface 11 of the first lens element 10 to the image plane 91, namely the total length of the optical imaging lens set along the optical axis 4 is TTL; the effective focal length of the optical imaging lens set is EFL; the distance from the object-side surface 11 of the first lens element 10 to the image-side surface 72 of the seventh lens element 70 along the optical axis 4 is TL; the distance between the image-side surface 72 of the seventh lens element 70 to the filter 90 along the optical axis 4 is G7F; the thickness of the filter 90 along the optical axis 4 is TF; the distance between the filter 90 to the image plane 91 along the optical axis 4 is GFP; and the distance between the image-side surface 72 of the seventh lens element 70 and the image plane 91 along the optical axis 4 is BFL. Therefore, BFL=G7F+TF+GFP.

Furthermore, the focal length of the first lens element 10 is f1; the focal length of the second lens element 20 is f2; the focal length of the third lens element 30 is f3; the focal length of the fourth lens element 40 is f4; the focal length of the fifth lens element 50 is f5; the focal length of the sixth lens element 60 is f6; the focal length of the seventh lens element 70 is f7; the refractive index of the first lens element 10 is n1; the refractive index of the second lens element 20 is n2; the refractive index of the third lens element 30 is n3; the refractive index of the fourth lens element 40 is n4; the refractive index of the fifth lens element 50 is n5; the refractive index of the sixth lens element 60 is n6; the refractive index of the seventh lens element 70 is n7; the Abbe number of the first lens element 10 is υ1; the Abbe number of the second lens element 20 is υ2; the Abbe number of the third lens element 30 is υ3; and the Abbe number of the fourth lens element 40 is υ4; the Abbe number of the fifth lens element 50 is υ5; the Abbe number of the sixth lens element 60 is υ6; and the Abbe number of the seventh lens element 70 is υ7. Tmin is the minimal lens element thickness among the first lens element and the seventh lens element; Tmax is the maximal lens element thickness among the first lens element and the seventh lens element; and Gmax is the maximal air gap among the first lens element and the seventh lens element.

First Example

Figure 7A:
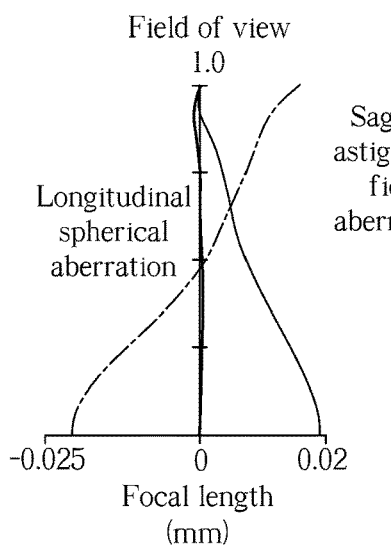
FIG. 7A illustrates the longitudinal spherical aberration of the first example.
Figure 7B:
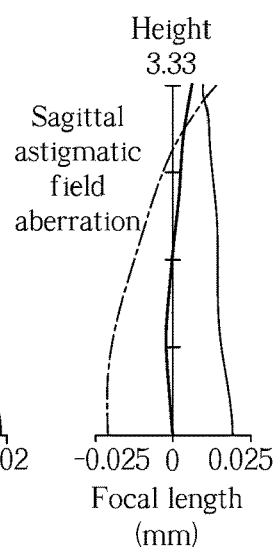
FIG. 7B illustrates the astigmatic aberration on the sagittal direction of the first example.
Figures 7C, 7D:
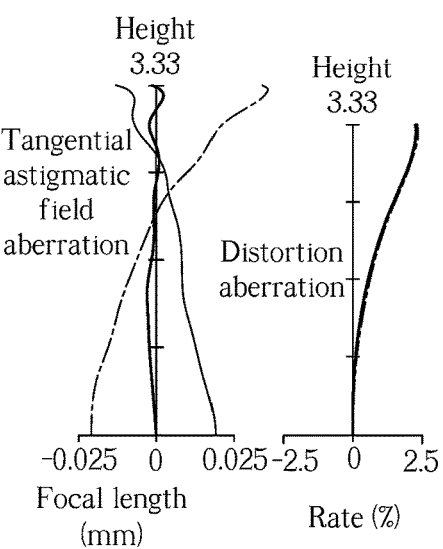
FIG. 7C illustrates the astigmatic aberration on the tangential direction of the first example.
FIG. 7D illustrates the distortion aberration of the first example.

Please refer to FIG. 6 which illustrates the first example of the optical imaging lens set 1 of the present invention. Please refer to FIG. 7A for the longitudinal spherical aberration on the image plane 91 of the first example; please refer to FIG. 7B for the astigmatic field aberration on the sagittal direction; please refer to FIG. 7C for the astigmatic field aberration on the tangential direction; and please refer to FIG. 7D for the distortion aberration. The Y axis of the spherical aberration in each example is "field of view" for 1.0. The Y axis of the astigmatic field and the distortion in each example stands for "image height", which is 3.241 mm.

The optical imaging lens set 1 of the first example exclusively has seven lens elements 10, 20, 30, 40, 50, 60 and 70 with refractive power. The optical imaging lens set 1 also has a filter 90, an aperture stop 80, and an image plane 91. The aperture stop 80 is provided between the first lens element 10 and the object side 2. The filter 90 may be used for preventing specific wavelength light (such as the infrared light) reaching the image plane to adversely affect the imaging quality.

The first lens element 10 has positive refractive power. The object-side surface 11 facing toward the object side 2 has a convex part 13 in the vicinity of the optical axis and a convex part 14 in a vicinity of its periphery. The image-side surface 12 facing toward the image side 3 has a concave part 16 in the vicinity of the optical axis and a concave part 17 in a vicinity of its periphery. Besides, both the object-side surface 11 and the image-side 12 of the first lens element 10 are aspherical surfaces.

The second lens element 20 has positive refractive power. The object-side surface 21 facing toward the object side 2 has a convex part 23 in the vicinity of the optical axis and a convex part 24 in a vicinity of its periphery. The image-side surface 22 facing toward the image side 3 has a concave part 26 in the vicinity of the optical axis and a convex part 27 in a vicinity of its periphery. Besides, both the object-side surface 21 and the image-side 22 of the second lens element 20 are aspherical surfaces.

The third lens element 30 has negative refractive power. The object-side surface 31 facing toward the object side 2 has a convex part 33 in the vicinity of the optical axis and a concave part 34 in a vicinity of its periphery. The image-side surface 32 facing toward the image side 3 has a concave part 36 in the vicinity of the optical axis and a concave part 37 in a vicinity of its periphery. The object-side surface 31 and the image-side 32 of the third lens element 30 are aspherical surfaces.

The fourth lens element 40 has positive refractive power. The object-side surface 41 facing toward the object side 2 has a concave part 43 in the vicinity of the optical axis and a concave part 44 in a vicinity of its periphery. The image-side surface 42 facing toward the image side 3 has a convex part 46 in the vicinity of the optical axis and a convex part 47 in a vicinity of its periphery. The object-side surface 41 and the image-side 42 of the fourth lens element 40 are aspherical surfaces.

The fifth lens element 50 has positive refractive power. The object-side surface 51 facing toward the object side 2 has a convex part 53 in the vicinity of the optical axis and a concave part 54 in a vicinity of its periphery. The image-side surface 52 facing toward the image side 3 has a convex part 56 in the vicinity of the optical axis and a convex part 57 in a vicinity of its periphery. Besides, at least one of the object-side surface 51 and the image-side 52 of the fifth lens element 50 is an aspherical surface.

The sixth lens element 60 has positive refractive power. The object-side surface 61 facing toward the object side 2 has a concave part 63 in the vicinity of the optical axis and a concave part 64 in a vicinity of its periphery. The image-side surface 62 facing toward the image side 3 has a convex part 66 in the vicinity of the optical axis and a convex part 67 in a vicinity of its periphery. Both the object-side surface 61 and the image-side 62 of the sixth lens element 60 are aspherical surfaces.

The seventh lens element 70 has negative refractive power. The object-side surface 71 facing toward the object side 2 has a concave part 73 in the vicinity of the optical axis and a concave part 74 in a vicinity of its periphery. The image-side surface 62 facing toward the image side 3 has a concave part 76 in the vicinity of the optical axis and a convex part 77 in a vicinity of its periphery. Both the object-side surface 71 and the image-side 72 of the seventh lens element 70 are aspherical surfaces. The filter 90 is disposed between the image-side 72 of the seventh lens element 70 and the image plane 91.

In the first lens element 10, the second lens element 20, the third lens element 30, the fourth lens element 40, the fifth lens element 50, the sixth lens element 60 and the seventh lens element 70 of the optical imaging lens element 1 of the present invention, there are 14 surfaces, such as the object-side surfaces 11/21/31/41/51/61/71 and the image-side surfaces 12/22/32/42/52/62/72. If a surface is aspherical, these aspheric coefficients are defined according to the following formula:

$$Z(Y) = \frac{Y^2}{R} \left/ \left(1 + \sqrt{1 - (1+K)\frac{Y^2}{R^2}}\right) + \sum_{i=1}^{n} a_i \times Y^i \right.$$

In which:
R represents the curvature radius of the lens element surface;
Z represents the depth of an aspherical surface (the perpendicular distance between the point of the aspherical surface at a distance
Y from the optical axis and the tangent plane of the vertex on the optical axis of the aspherical surface);
Y represents a vertical distance from a point on the aspherical surface to the optical axis;
K is a conic constant; and
$a_i$ is the aspheric coefficient of the $i^{th}$ order.

The optical data of the first example of the optical imaging lens set 1 are shown in FIG. 18 while the aspheric surface data are shown in FIG. 19. In the present examples of the optical imaging lens set, the f-number of the entire optical lens element system is Fno, EFL is the effective focal length, HFOV stands for the half field of view which is half of the field of view of the entire optical lens element system, and the unit for the curvature radius, the thickness and the focal length is in millimeters (mm). TTL is 6.4100 mm. Fno is 2.7633. The image height is 3.33 mm. HFOV is 28.9512 degrees.

Second Example

Figure 8:
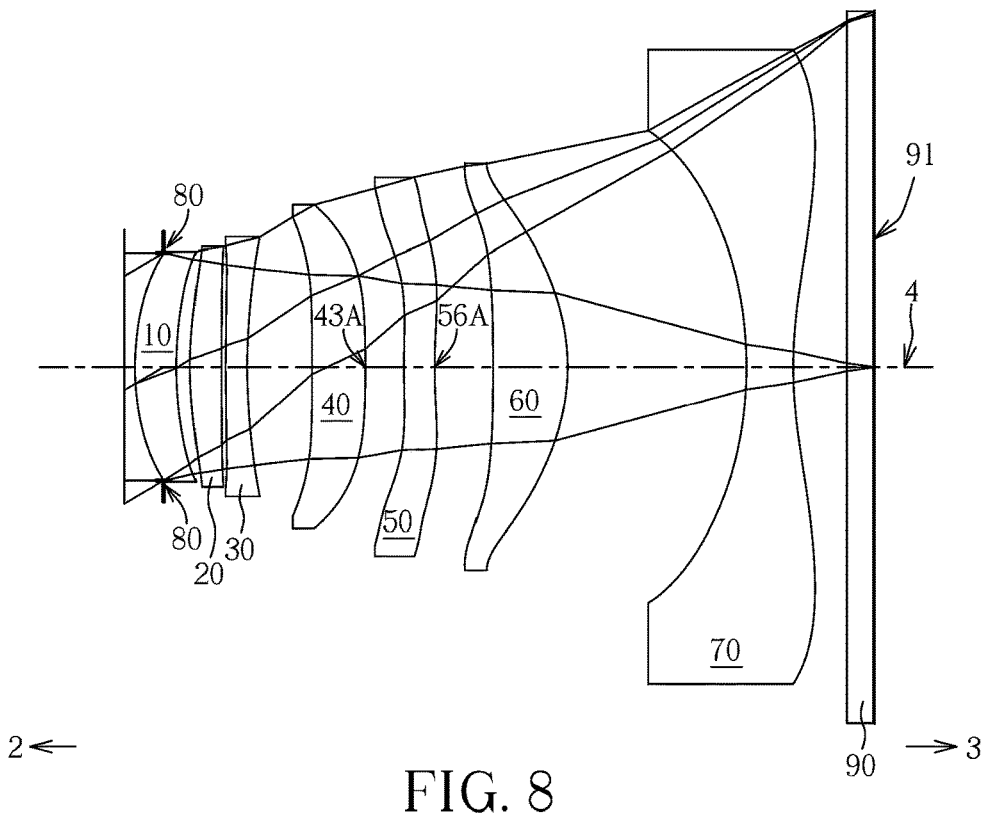
FIG. 8 illustrates a second example of the optical imaging lens set of seven lens elements of the present invention.
Figures 9A, 9B, 9C, 9D:
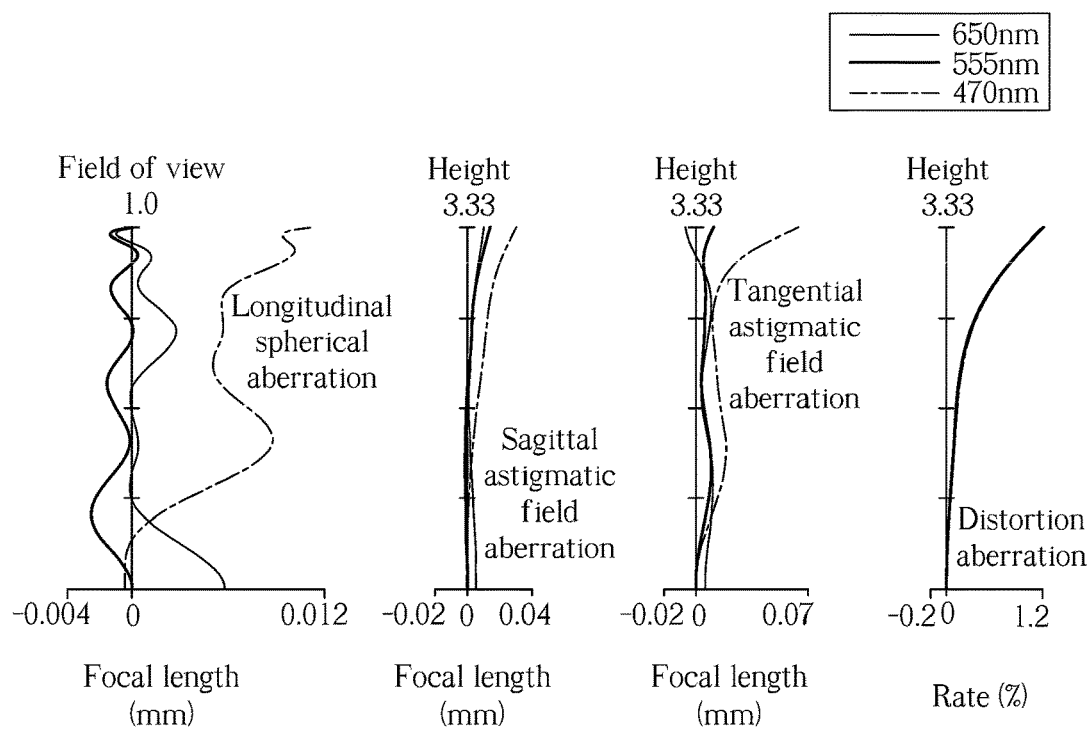
FIG. 9A illustrates the longitudinal spherical aberration of the second example.
FIG. 9B illustrates the astigmatic aberration on the sagittal direction of the second example.
FIG. 9C illustrates the astigmatic aberration on the tangential direction of the second example.
FIG. 9D illustrates the distortion aberration of the second example.

Please refer to FIG. 8 which illustrates the second example of the optical imaging lens set 1 of the present invention. It is noted that from the second example to the following examples, in order to simplify the figures, only the components different from what the first example has, and the basic lens elements will be labeled in figures. Other components that are the same as what the first example has, such as the object-side surface, the image-side surface, the part in a vicinity of the optical axis and the part in a vicinity of its periphery will be omitted in the following examples. Please refer to FIG. 9A for the longitudinal spherical aberration on the image plane 91 of the second example, please refer to FIG. 9B for the astigmatic aberration on the sagittal direction, please refer to FIG. 9C for the astigmatic aberration on the tangential direction, and please refer to FIG. 9D for the distortion aberration. The components in the second example are similar to those in the first example, but the optical data such as the curvature radius, the refractive power, the lens thickness, the lens focal length, the aspheric surface or the back focal length in this example are different from the optical data in the first example, and in this example, the object-side surface 41 of the fourth lens element 40 has a convex part 43A in a vicinity of the optical axis, the fifth lens element 50 has negative refractive power, and the image-side surface 52 of the fifth lens element 50 has a concave part 56A in a vicinity of the optical axis.

The optical data of the second example of the optical imaging lens set are shown in FIG. 20 while the aspheric surface data are shown in FIG. 21. TTL is 6.8864 mm. Fno is 2.3684. The image height is 3.33 mm. HFOV is 30.4922 degrees. In particular, (1) the Fno of the second example is smaller than that of the first example of the present invention, (2) the HFOV of the second example is larger than that of the first example, (3) the imaging quality of the second example is better than that of the first example of the present invention, (4) the fabrication of the second example is easier than the first example so the yield is better.

Third Example

Figure 10:
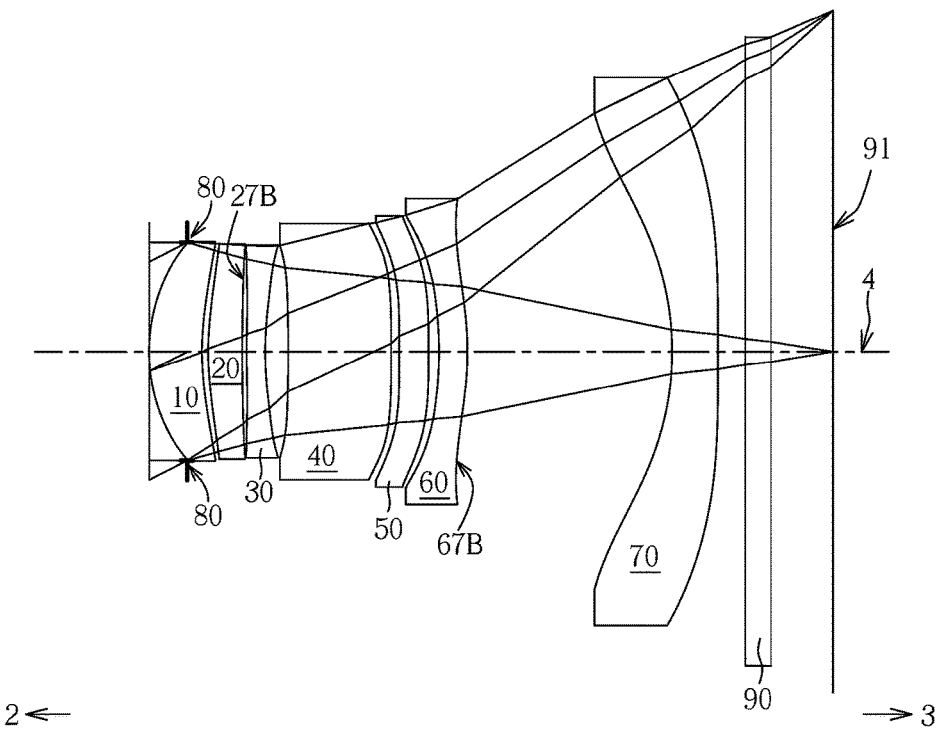
FIG. 10 illustrates a third example of the optical imaging lens set of seven lens elements of the present invention.
Figures 11A, 11B, 11C, 11D:
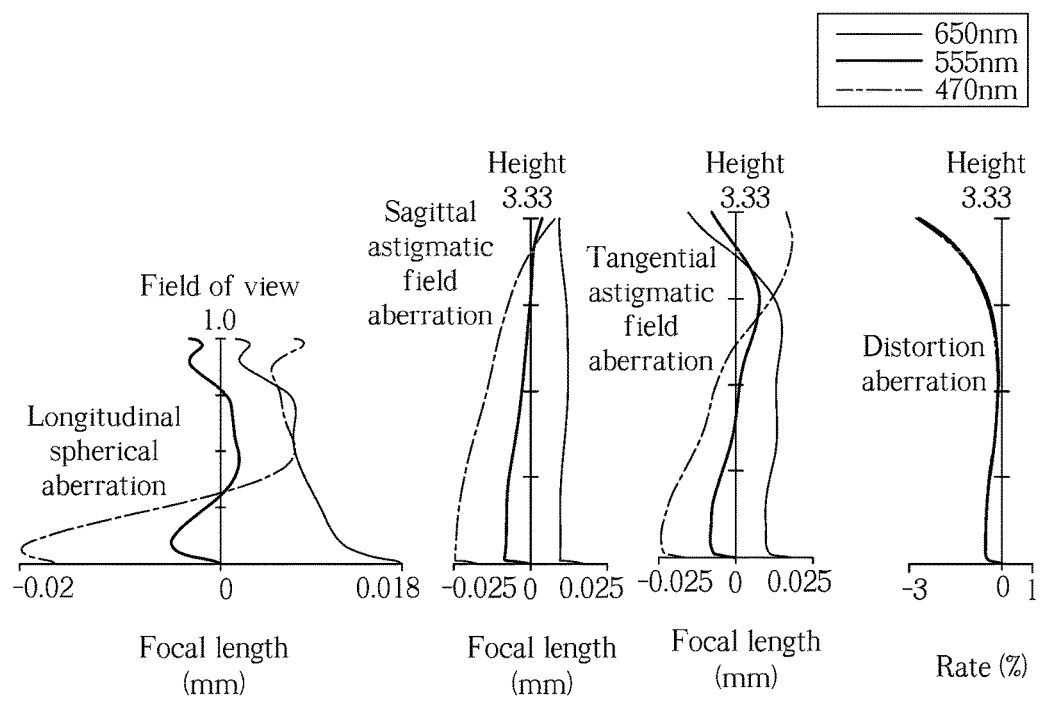
FIG. 11A illustrates the longitudinal spherical aberration of the third example.
FIG. 11B illustrates the astigmatic aberration on the sagittal direction of the third example.
FIG. 11C illustrates the astigmatic aberration on the tangential direction of the third example.
FIG. 11D illustrates the distortion aberration of the third example.

Please refer to FIG. 10 which illustrates the third example of the optical imaging lens set 1 of the present invention. Please refer to FIG. 11A for the longitudinal spherical aberration on the image plane 91 of the third example; please refer to FIG. 11B for the astigmatic aberration on the sagittal direction; please refer to FIG. 11C for the astigmatic aberration on the tangential direction; and please refer to FIG. 11D for the distortion aberration. The components in the third example are similar to those in the first example, but the optical data such as the curvature radius, the refractive power, the lens thickness, the lens focal length, the aspheric surface or the back focal length in this example are different from the optical data in the first example, and in this example, the image-side surface 22 of the second lens element 20 has a concave part 27B in a vicinity of its periphery, the fourth lens element 40 has negative refractive power, and the image-side surface 62 of the sixth lens element 60 has a concave part 67B in a vicinity of its periphery.

The optical data of the third example of the optical imaging lens set are shown in FIG. 22 while the aspheric surface data are shown in FIG. 23. TTL is 6.6643 mm. Fno is 3.1062. The image height is 3.33 mm. HFOV is 27.2040 degrees. In particular, (1) the imaging quality of the third example is better than that of the first example of the present invention, (2) the fabrication of the third example is easier than the first example so the yield is better.

Fourth Example

Figure 12:
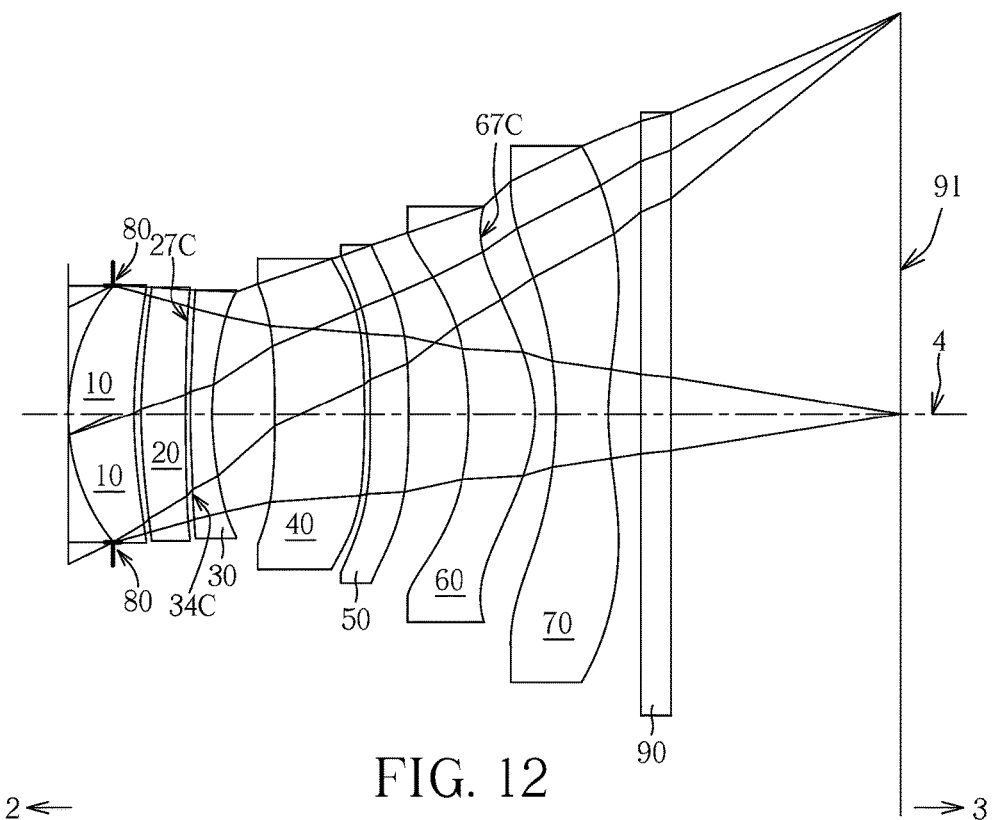
FIG. 12 illustrates a fourth example of the optical imaging lens set of seven lens elements of the present invention.
Figures 13A, 13B, 13C, 13D:
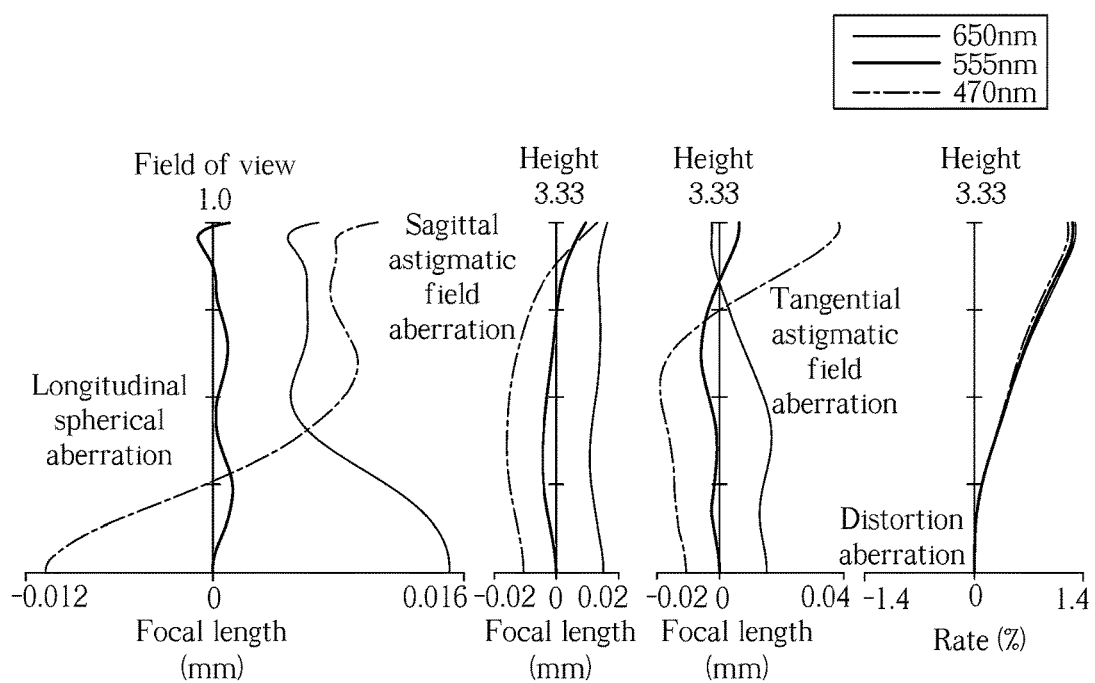
FIG. 13A illustrates the longitudinal spherical aberration of the fourth example.
FIG. 13B illustrates the astigmatic aberration on the sagittal direction of the fourth example.
FIG. 13C illustrates the astigmatic aberration on the tangential direction of the fourth example.
FIG. 13D illustrates the distortion aberration of the fourth example.

Please refer to FIG. 12 which illustrates the fourth example of the optical imaging lens set 1 of the present invention. Please refer to FIG. 13A for the longitudinal spherical aberration on the image plane 91 of the fourth example; please refer to FIG. 13B for the astigmatic aberration on the sagittal direction; please refer to FIG. 13C for the astigmatic aberration on the tangential direction; and please refer to FIG. 13D for the distortion aberration. The components in the fourth example are similar to those in the first example, but the optical data such as the curvature radius, the refractive power, the lens thickness, the lens focal length, the aspheric surface or the back focal length in this example are different from the optical data in the first example, and in this example, the image-side surface 22 of the second lens element 20 has a concave part 27C in a vicinity of its periphery, the object-side surface 31 of the third lens element 30 has a convex part 34C in a vicinity of its periphery, and the image-side surface 62 of the sixth lens element 60 has a concave part 67C in a vicinity of its periphery.

The optical data of the fourth example of the optical imaging lens set are shown in FIG. 26 while the aspheric surface data are shown in FIG. 27. TTL is 6.8912 mm. Fno is 3.1438. The image height is 3.33 mm. HFOV is 26.1534 degrees. In particular, (1) the fabrication of the fourth example is easier than the first example so the yield is better.

Fifth Example

Figure 14:
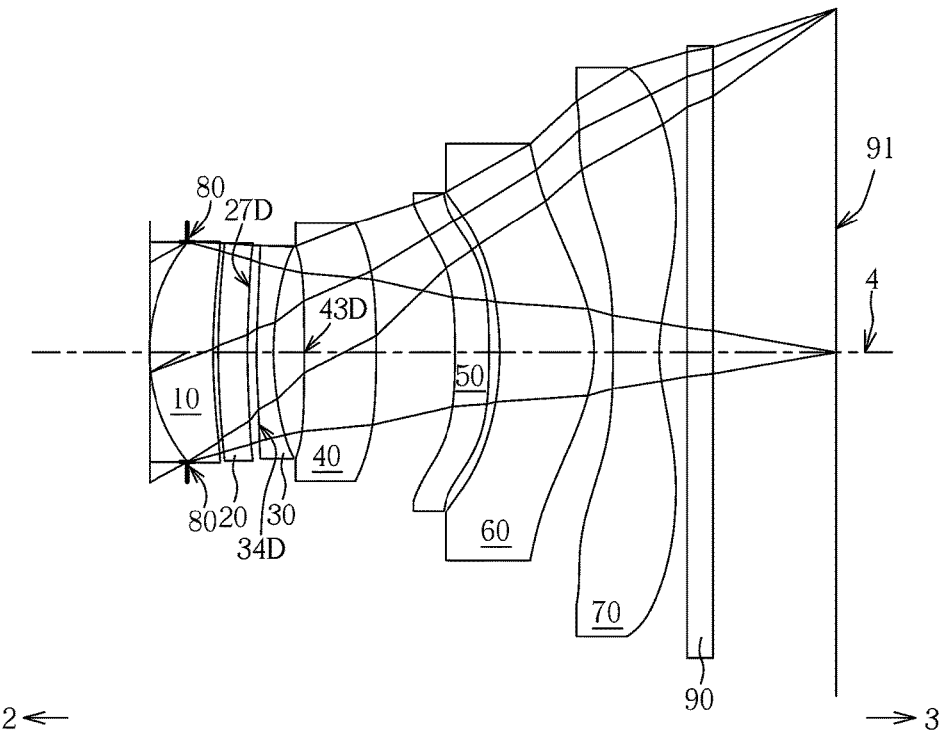
FIG. 14 illustrates a fifth example of the optical imaging lens set of seven lens elements of the present invention.
Figures 15A, 15B, 15C, 15D:
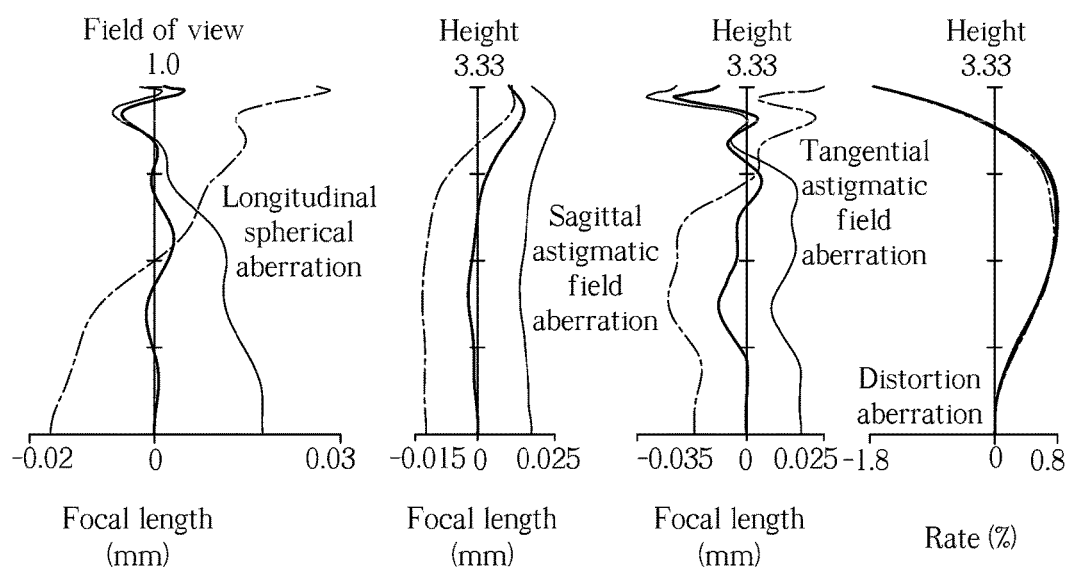
FIG. 15A illustrates the longitudinal spherical aberration of the fifth example.
FIG. 15B illustrates the astigmatic aberration on the sagittal direction of the fifth example.
FIG. 15C illustrates the astigmatic aberration on the tangential direction of the fifth example.
FIG. 15D illustrates the distortion aberration of the fifth example.

Please refer to FIG. 14 which illustrates the fifth example of the optical imaging lens set 1 of the present invention. Please refer to FIG. 15A for the longitudinal spherical aberration on the image plane 91 of the fifth example; please refer to FIG. 15B for the astigmatic aberration on the sagittal direction; please refer to FIG. 15C for the astigmatic aberration on the tangential direction; and please refer to FIG. 15D for the distortion aberration. The components in the fifth example are similar to those in the first example, but the optical data such as the curvature radius, the refractive power, the lens thickness, the lens focal length, the aspheric surface or the back focal length in this example are different from the optical data in the first example, and in this example, the image-side surface 22 of the second lens element 20 has a concave part 27D in a vicinity of its periphery, the object-side surface 31 of the third lens element 30 has a convex part 34D in a vicinity of its periphery, and the object-side surface 41 of the fourth lens element 40 has a convex part 43D in a vicinity of the optical axis.

The optical data of the fifth example of the optical imaging lens set are shown in FIG. 26 while the aspheric surface data are shown in FIG. 27. TTL is 6.6495 mm. Fno is 2.9270. The image height is 3.33 mm. HFOV is 28.4828 degrees. In particular, (1) the fabrication of the fifth example is easier than the first example so the yield is better.

Sixth Example

Please refer to FIG. 16 which illustrates the sixth example of the optical imaging lens set 1 of the present invention. Please refer to FIG. 17A for the longitudinal spherical aberration on the image plane 91 of the sixth example; please refer to FIG. 17B for the astigmatic aberration on the sagittal direction; please refer to FIG. 17C for the astigmatic aberration on the tangential direction; and please refer to FIG. 17D for the distortion aberration. The components in the sixth example are similar to those in the first example, but the optical data such as the curvature radius, the refractive power, the lens thickness, the lens focal length, the aspheric surface or the back focal length in this example are different from the optical data in the first example, and in this example, the image-side surface 22 of the second lens element 20 has a concave part 27E in a vicinity of its periphery, the object-side surface 41 of the fourth lens element 40 has a convex part 43E in a vicinity of the optical axis, and the fifth lens element 50 has negative refractive power.

The optical data of the sixth example of the optical imaging lens set are shown in FIG. 28 while the aspheric surface data are shown in FIG. 29. TTL is 6.8168 mm. Fno is 2.4044. The image height is 3.33 mm. HFOV is 29.6100 degrees. In particular, (1) the Fno of the sixth example is smaller than that of the first example of the present invention, (2) the HFOV of the sixth example is larger than that of the first example, (3) the imaging quality of the sixth example is better than that of the first example of the present invention, and (4) the fabrication of the sixth example is easier than the first example so the yield is better.

Some important ratios in each example are shown in FIG. 30 and in FIG. 31.

In the light of the above examples, the inventors observe at least the following features of the lens arrangement of the present invention and the corresponding efficacy:

1. The first lens element has positive refracivity power and the second lens element has positive refractive power, to help the collection of incoming light. The third lens element has negative refractive power, which helps to adjust the aberration caused by the first and the second lens elements. The seventh lens element has an image-side surface with a concave portion in a vicinity of the optical-axis, which helps to adjust the whole aberration. Furthermore, the sixth lens element has an object-side surface with a concave portion in a vicinity of the optical-axis, which helps to adjust the aberration caused by the previous five lens elements. Or on the other hand, the sixth lens element has positive refractive power and has an image-side surface with a convex portion in a vicinity of the optical-axis, which helps to collect the incoming light, and the seventh lens element has an image-side surface with a convex portion in a vicinity of its periphery, which helps to adjust the aberration caused by the previous six lens elements, in particular, to enhance local imaging quality.

2. When the conditional formula $\upsilon6 \geq 50$, preferably $60 \geq \upsilon6 \geq 50$ is satisfied, bad imaging quality caused by the spherical aberration and the chromatic aberration can be decreased, thereby enhancing imaging quality.

3. The combination of the above designs may effectively shorten the lens length and ensure good imaging quality to enhance the image definition.

In addition, the inventors further discover that there are some better ratio ranges for different optical data according to the above various important ratios. Better optical ratio ranges help the designers to design a better optical performance and an effectively reduce length of a practically possible optical imaging lens set:

a) To diminish the total length, the present invention proposes to reduce the lens thickness and air gaps between adjacent lens elements. Taking the assembly fabrication and imaging quality into consideration, the lens thickness and the air gaps should be coordinated with each other. The following conditions help the optical imaging lens set have better arrangement: $AAG/BFL \leq 6$, preferably, the range is between $0.4 \leq AAG/BFL \leq 6$; $AAG/G56 \leq 25$, preferably, the range is between $1.0 \leq AAG/G56 \leq 25$; $T4/G56 \leq 10$, preferably, the range is between $0.08 \leq T4/G56 \leq 10$.

b) A smaller EFL helps enlarge the field angle, so the EFL is preferably smaller. The following conditions help the enlargement of the field angle in order to reduce the total length of the optical imaging lens set: $EFL/AAG \leq 5$, preferably, the range is between $1.0 \leq EFL/AAG \leq 5$; $EFL/(G12+G23+G45) \leq 45$, preferably, the range is between $6.3 \leq EFL/(G12+G23+G45) \leq 45$; $EFL/ALT \leq 2.2$, preferably, the range is between $1.0 \leq EFL/ALT \leq 2.2$.

c) The optical parameters and the total length of the optical imaging lens set together keep a suitable range so the parameters are not so great to enlarge the total length of the optical imaging lens set or too small to fabricate.

TTL/BFL≤15, preferably, the range is between 5.0≤TTL/BFL≤15; TL/ALT≤2.2, preferably, the range is between 1.1≤TL/ALT≤2.2; TTL/T1≤18, preferably, the range is between 8.0≤TTL/T1≤18; TL/(G12+G23+G45)≤30, preferably, the range is between 4.9≤TL/(G12+G23+G45)≤30; TTL/T7≤16, preferably, the range is between 7.0≤TTL/T7≤16.

d) By limiting the optical parameters and the second lens element thickness T2, the second lens element thickness T2 is not so large or so small to facilitate the reduction of the optical aberration cause by the first lens element. T2/(G12+G23+G45)≤2.5, preferably, the range is between 0.3≤T2/(G12+G23+G45)≤2.5.

e) By limiting the optical parameters and the fifth lens element thickness T5, the fifth lens element thickness T5 is not so large or so small to facilitate the reduction of the optical aberration cause by the first lens element. T5/T3≤2, preferably, the range is between 1.0≤T5/T3≤2; G34/T5≤2.5, preferably, the range is between 0.1≤G34/T5≤2.5.

f) By limiting the optical parameters and the sixth lens element thickness T6, the sixth lens element thickness T6 is not so large or so small to facilitate the reduction of the optical aberration cause by the first lens element. ALT/T6≤11, preferably, the range is between 3.4≤ALT/T6≤11; T6/G67≤5, preferably, the range is between 0.1≤T6/G67≤5.

In each one of the above examples, the longitudinal spherical aberration, the astigmatic aberration and the distortion aberration meet requirements in use. By observing three representative wavelengths of red, green and blue, it is suggested that all curves of every wavelength are close to one another, which reveals off-axis light of different heights of every wavelength all concentrates on the image plane, and deviations of every curve also reveal that off-axis light of different heights are well controlled so the examples do improve the spherical aberration, the astigmatic aberration and the distortion aberration. In addition, by observing the imaging quality data the distances amongst the three representing different wavelengths are pretty close to one another, which means the present invention is able to concentrate light of the three representing different wavelengths so that the aberration is greatly improved. Given the above, the present invention provides outstanding imaging quality.

In the light of the unpredictability of the optical imaging lens set, the present invention suggests the above principles to have a shorter total length of the optical imaging lens set, a larger aperture available, a wider field angle, better imaging quality or a better fabrication yield to overcome the drawbacks of prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens set, from an object side toward an image side in order along an optical axis comprising: a first lens element, a second lens element, a third lens element, a fourth lens element, a fifth lens element, a sixth lens element and a seventh lens element, said first lens element to said seventh lens element each having an object-side surface facing toward the object side as well as an image-side surface facing toward the image side, wherein:

said first lens element has positive refractive power;
said second lens element has positive refractive power;
said third lens element has negative refractive power;
said fourth lens element has an object-side surface with a concave part in a vicinity of its periphery, said fourth lens element has an image-side surface with a convex part in a vicinity of the optical axis;
said sixth lens element has an object-side surface with a concave part in a vicinity of the optical axis; and
said seventh lens element has an image-side surface with a concave part in a vicinity of the optical axis;
the optical imaging lens set exclusively has seven lens elements with refractive power, in addition, υ6 is the Abbe number of the sixth lens element, and the optical imaging lens set satisfies the relationship: υ6≥50.

2. The optical imaging lens set of claim 1, wherein TTL is a distance from said object-side surface of said first lens element to an image plane along said optical axis, BFL is a distance between said image-side surface of said seventh lens element and an image plane along said optical axis, and the optical imaging lens set satisfies the relationship: TTL/BFL≤15.

3. The optical imaging lens set of claim 1, wherein TL is a distance between said object-side surface of said first lens element and said image-side surface of said seventh lens element along said optical axis, ALT is a total thickness of all seven lens elements along said optical axis, and the optical imaging lens set satisfies the relationship: TL/ALT≤2.2.

4. The optical imaging lens set of claim 1, wherein EFL is an effective focal length of the optical imaging lens set, AAG is a sum of all six air gaps between each lens elements from said first lens element to said seventh lens element along said optical axis, and the optical imaging lens set satisfies the relationship: EFL/AAG≤5.

5. The optical imaging lens set of claim 1, wherein TTL is a distance from said object-side surface of said first lens element to an image plane along said optical axis, T1 is a thickness of said first lens element along said optical axis, and the optical imaging lens set satisfies the relationship: TTL/T1≤18.

6. The optical imaging lens set of claim 1, wherein AAG is a sum of all six air gaps between each lens elements from said first lens element to said seventh lens element along said optical axis, BFL is a distance between said image-side surface of said seventh lens element and an image plane along said optical axis, and the optical imaging lens set satisfies the relationship: AAG/BFL≤6.

7. The optical imaging lens set of claim 1, wherein TL is a distance between said object-side surface of said first lens element and said image-side surface of said seventh lens element along said optical axis, G12 is an air gap between said first lens element and said second lens element along said optical axis, G23 is an air gap between said second lens element and said third lens element along said optical axis, G45 is an air gap between said fourth lens element and said fifth lens element along said optical axis, and the optical imaging lens set satisfies the relationship: TL/(G12+G23+G45)≤30.

8. The optical imaging lens set of claim 1, wherein T3 is a thickness of said third lens element along said optical axis, T5 is a thickness of said fifth lens element along said optical axis, and the optical imaging lens set satisfies the relationship: T5/T3≤2.

9. The optical imaging lens set of claim 1, wherein ALT is a total thickness of all seven lens elements along said optical axis, T6 is a thickness of said sixth lens element along said optical axis, and the optical imaging lens set satisfies the relationship: ALT/T6≤11.

10. The optical imaging lens set of claim 1, wherein EFL is an effective focal length of the optical imaging lens set, G12 is an air gap between said first lens element and said second lens element along said optical axis, G23 is an air gap between said second lens element and said third lens element along said optical axis, G45 is an air gap between said fourth lens element and said fifth lens element along said optical axis, and the optical imaging lens set satisfies the relationship: EFL/(G12+G23+G45)≤45.

11. An optical imaging lens set, from an object side toward an image side in order along an optical axis comprising: a first lens element, a second lens element, a third lens element, a fourth lens element, a fifth lens element, a sixth lens element and a seventh lens element, said first lens element to said seventh lens element each having an object-side surface facing toward the object side as well as an image-side surface facing toward the image side, wherein:
said first lens element has positive refractive power;
said second lens element has positive refractive power;
said third lens element has negative refractive power;
said fourth lens element has an image-side surface with a convex part in a vicinity of the optical axis and a convex part in a vicinity of its periphery;
said sixth lens element has positive refractive power, and said sixth lens element has an image-side surface with a convex part in a vicinity of the optical axis; and
said seventh lens element has an image-side surface with a concave part in a vicinity of the optical axis, and a convex part in a vicinity of its periphery;
the optical imaging lens set exclusively has seven lens elements with refractive power.

12. The optical imaging lens set of claim 11, wherein TTL is a distance from said object-side surface of said first lens element to an image plane along said optical axis, BFL is a distance between said image-side surface of said seventh lens element and an image plane along said optical axis, and the optical imaging lens set satisfies the relationship: TTL/BFL≤15.

13. The optical imaging lens set of claim 11, wherein TL is a distance between said object-side surface of said first lens element and said image-side surface of said seventh lens element along said optical axis, ALT is a total thickness of all seven lens elements along said optical axis, and the optical imaging lens set satisfies the relationship: TL/ALT≤2.2.

14. The optical imaging lens set of claim 11, wherein TTL is a distance from said object-side surface of said first lens element to an image plane along said optical axis, T7 is a thickness of said seventh lens element along said optical axis, and the optical imaging lens set satisfies the relationship: TTL/T7≤16.

15. The optical imaging lens set of claim 11, wherein AAG is a sum of all six air gaps between each lens elements from said first lens element to said seventh lens element along said optical axis, G56 is an air gap between said fifth lens element and said sixth lens element along said optical axis, and the optical imaging lens set satisfies the relationship: AAG/G56≤25.

16. The optical imaging lens set of claim 11, wherein T2 is a thickness of said second lens element along said optical axis, G12 is an air gap between said first lens element and said second lens element along said optical axis, G23 is an air gap between said second lens element and said third lens element along said optical axis, G45 is an air gap between said fourth lens element and said fifth lens element along said optical axis, and the optical imaging lens set satisfies the relationship: T2/(G12+G23+G45)≤2.5.

17. The optical imaging lens set of claim 11, wherein G34 is an air gap between said third lens element and said fourth lens element along said optical axis, T5 is a thickness of said fifth lens element along said optical axis, and the optical imaging lens set satisfies the relationship: G34/T5≤2.5.

18. The optical imaging lens set of claim 11, wherein G67 is an air gap between said sixth lens element and said seventh lens element along said optical axis, T6 is a thickness of said sixth lens element along said optical axis, and the optical imaging lens set satisfies the relationship: T6/G67≤5.

19. The optical imaging lens set of claim 11, wherein G56 is an air gap between said fifth lens element and said sixth lens element along said optical axis, T4 is a thickness of said fourth lens element along said optical axis, and the optical imaging lens set satisfies the relationship: T4/G56≤10.

* * * * *